US012623296B2

(12) United States Patent (10) Patent No.: US 12,623,296 B2

Xie et al. (45) Date of Patent: May 12, 2026

(54) BENCH PIPE THREADING MACHINE AND THREADING METHOD

(71) Applicant: Hangzhou Hongli Pipe Machinery Co., Ltd, Hangzhou (CN)

(72) Inventors: Hongwu Xie, Hangzhou (CN); Chenchen Fei, Hangzhou (CN)

(73) Assignee: Hangzhou Hongli Pipe Machinery Co., Ltd, Hangzhou (CN)

( * ) Notice: Subject to any disclaimer, the term of this patent is extended or adjusted under 35 U.S.C. 154(b) by 759 days.

(21) Appl. No.: 17/900,899

(22) Filed: Sep. 1, 2022

(65) Prior Publication Data

US 2023/0069703 A1 Mar. 2, 2023

(30) Foreign Application Priority Data

Sep. 1, 2021 (CN) .......................... 202111021635.6

(51) Int. Cl.
B23G 1/22 (2006.01)
B23B 5/16 (2006.01)
(Continued)

(52) U.S. Cl.
CPC ................ B23G 1/22 (2013.01); B23B 5/165 (2013.01); B23G 1/52 (2013.01); B23G 5/20 (2013.01);
(Continued)

(58) Field of Classification Search
CPC . B23G 1/22; B23G 1/225; B23G 1/52; B23G 5/20; B23G 5/103; B23G 5/12
See application file for complete search history.

(56) References Cited

U.S. PATENT DOCUMENTS 2,692,996 A * 11/1954 Wallace ................... B23G 1/22
470/57
4,404,721 A * 9/1983 Ohyama ................. B23P 23/04
29/33 T
(Continued)

FOREIGN PATENT DOCUMENTS

CN 2197160 Y 5/1995
CN 2487483 Y * 4/2002
(Continued)

OTHER PUBLICATIONS

Machine Translation of CN 207695787 U, which CN '787 was published Aug. 7, 2018.*

(Continued)

*Primary Examiner* — Erica E Cadugan
(74) *Attorney, Agent, or Firm* — Bayramoglu Law Offices LLC

(57) ABSTRACT

A bench pipe threading machine and a threading method are provided. The bench pipe threading machine includes a spindle assembly, a die head assembly, a cutter assembly, a reamer assembly, a lifting handle assembly, and a frame assembly. The spindle assembly, the die head assembly, the cutter assembly, the reamer assembly, and the lifting handle assembly are mounted on the frame assembly. The die head assembly, the cutter assembly, and the reamer assembly are respectively matched with the spindle assembly. The frame assembly includes a frame mechanism and a carriage mechanism that is mounted on the frame mechanism. A transmission mechanism is mounted in the frame mechanism and connected to the spindle assembly. The spindle assembly and the lifting handle assembly are mounted on the frame mechanism. The die head assembly, the cutter assembly, and the reamer assembly are mounted on the carriage mechanism.

9 Claims, 26 Drawing Sheets

Pipe fitting to be processed

(51) Int. Cl.

| | |
|---|---|
| *B23G 1/52* | (2006.01) |
| *B23G 5/04* | (2006.01) |
| *B23G 5/10* | (2006.01) |
| *B23G 5/20* | (2006.01) |
| *B23P 23/02* | (2006.01) |
| *B23G 5/18* | (2006.01) |

(52) U.S. Cl.
CPC ................ *B23G 5/04* (2013.01); *B23G 5/186* (2013.01); *B23G 2240/12* (2013.01); *B23P 23/02* (2013.01); *Y10T 29/5199* (2015.01)

(56) References Cited

U.S. PATENT DOCUMENTS

| | | | | |
|---|---|---|---|---|
| 12,390,870 | B2 * | 8/2025 | Pechstein | B23G 1/24 |
| 12,479,038 | B2 * | 11/2025 | Xie | B23G 1/24 |

FOREIGN PATENT DOCUMENTS

| | | | | |
|---|---|---|---|---|
| CN | 2488632 | Y | * | 5/2002 |
| CN | 2491169 | Y | | 5/2002 |
| CN | 201702474 | U | | 1/2011 |
| CN | 205362885 | U | | 7/2016 |
| CN | 205362906 | U | | 7/2016 |
| CN | 207695787 | U | | 8/2018 |

OTHER PUBLICATIONS

Machine Translation of CN 2487483 Y, which CN '483 was published Apr. 24, 2002.*

Machine Translation of CN 2488632 Y, which CN '632 was published May 1, 2002.*

Machine Translation of CN 205362885 U, which CN '885 was published Jul. 6, 2016.*

* cited by examiner

Pipe fitting to
be processed

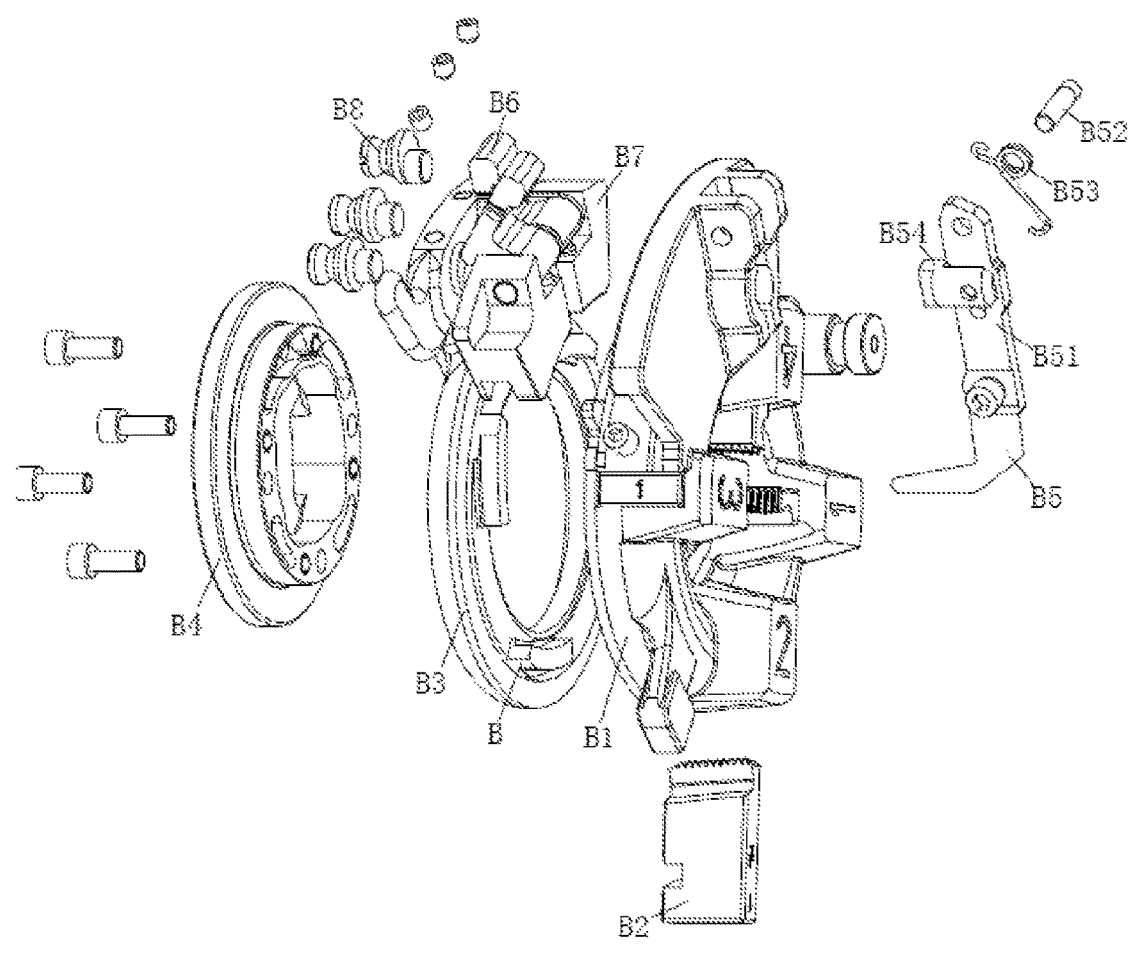
FIG. 8
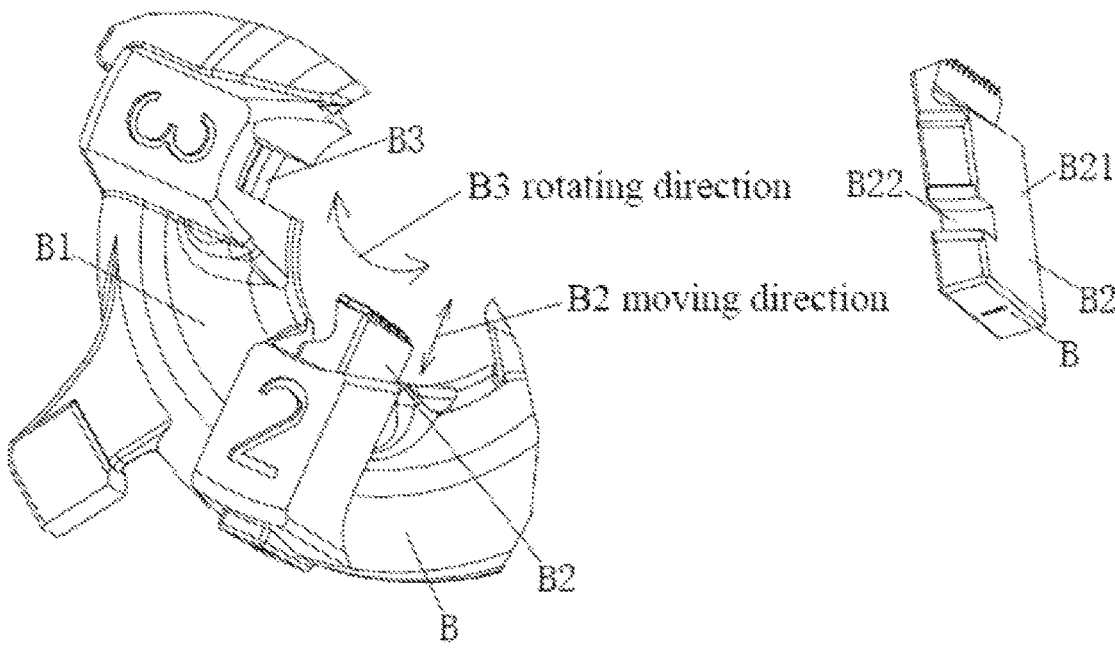
FIG. 9A                                                                                 FIG. 9B

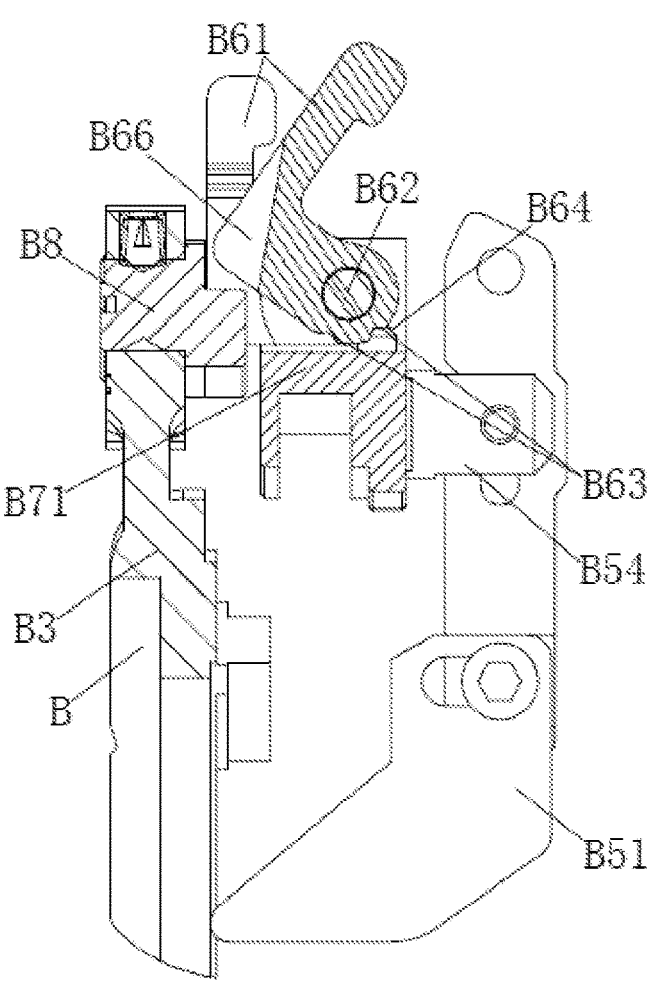
FIG. 10A
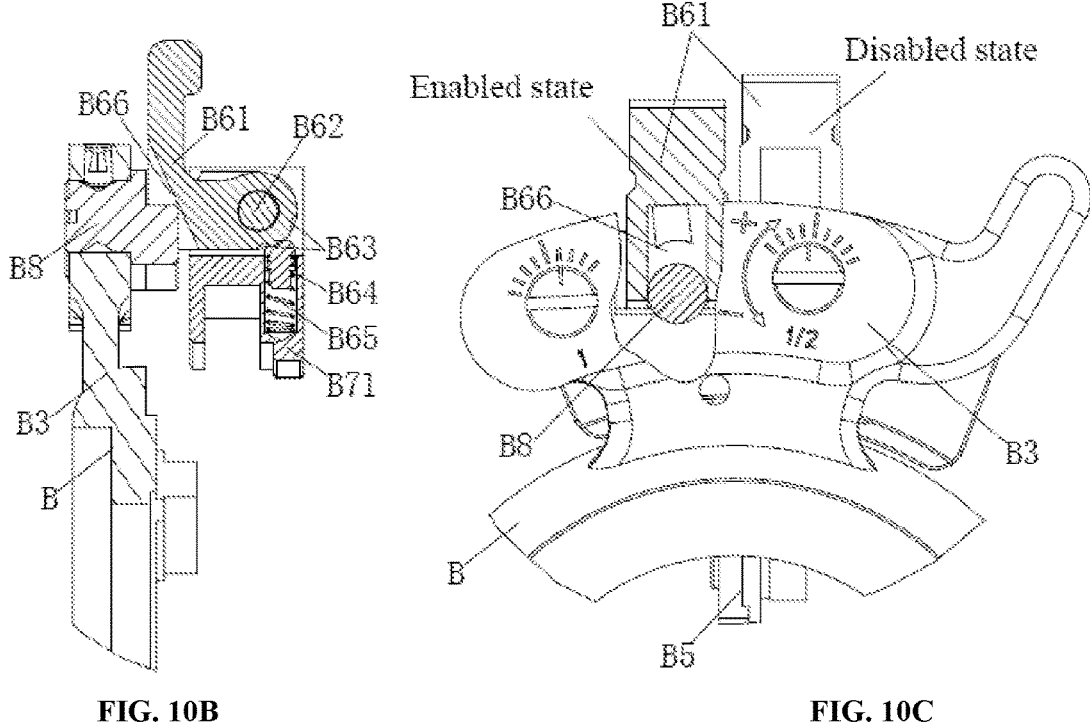
FIG. 10B                                       FIG. 10C

C41

C4

C

C42

C11

C1

C21

C22

C2

C3

C32

C31

C13

C12

Pipe fitting to
be processed

C5 C51 C52

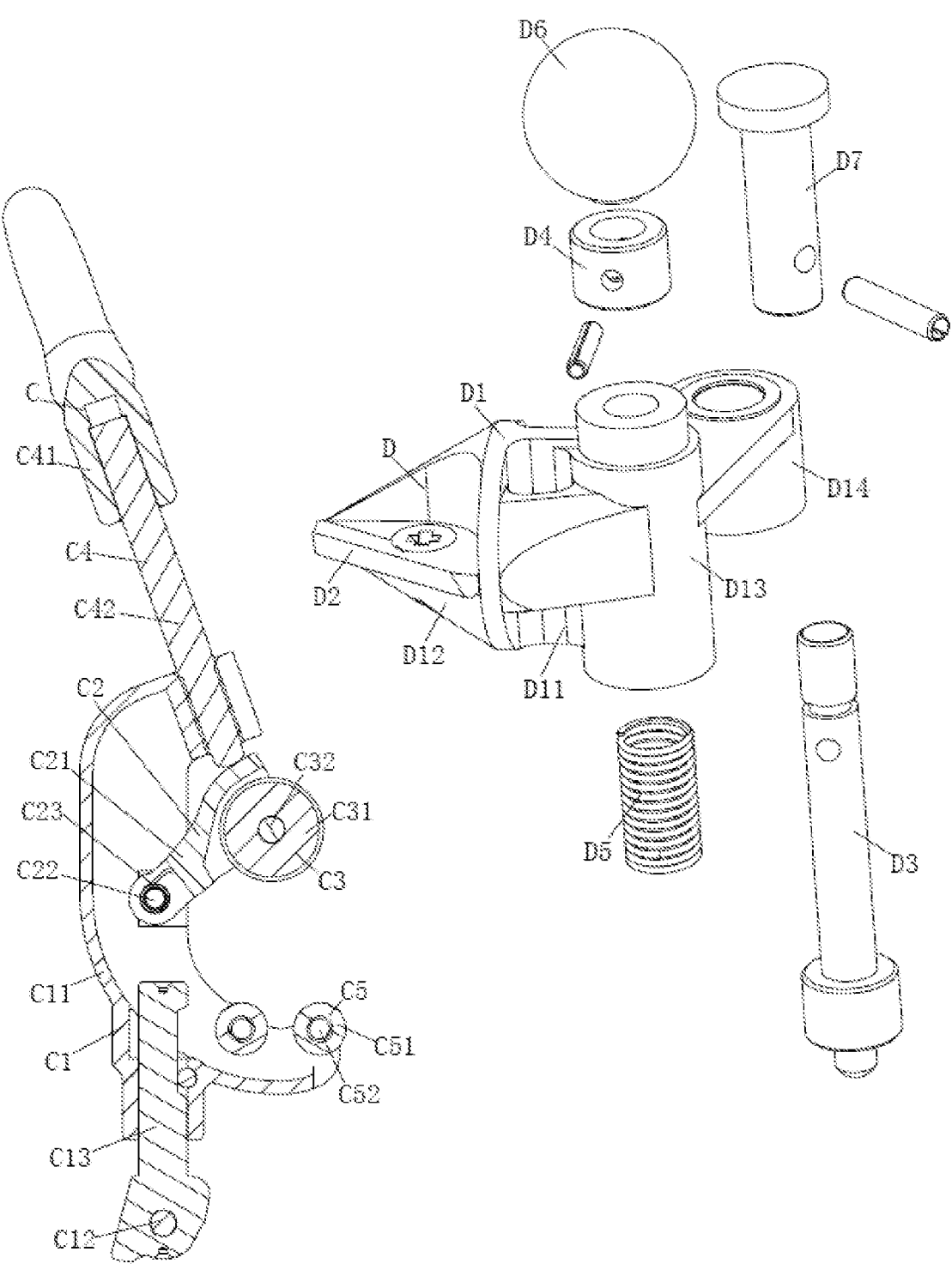
FIG. 14                    FIG. 15

Pouring a Lubricating and Cooling Liquid on a Die Of the Die Head Assembly

FIG. 30

BENCH PIPE THREADING MACHINE AND THREADING METHOD

CROSS REFERENCE TO THE RELATED APPLICATIONS

This application is based upon and claims priority to Chinese Patent Application No. 202111021635.6, filed on Sep. 1, 2021, the entire contents of which are incorporated herein by reference.

TECHNICAL FIELD

The present disclosure relates to a bench pipe threading machine and a threading method, which belong to the field of external thread processing devices. The bench pipe threading machine is mainly configured to process external pipe threads and cut off pipe fittings in the pipeline connection in such industries as construction, fire protection, petroleum, and chemical industries, and can also be configured to mount pipe joints for the pipe fittings having the processed external pipe threads. In addition, this machine can also process metric external threads.

BACKGROUND

The threading machine is often referred to as an electric threading machine, an electric pipe threading machine, a twisting machine, a pipe threading machine, and a steel bar threading machine. The threading machine is an electrical tool that gradually replaced the manual pipe threading plates that were used before 1980. The threading machines simplify and expedite the pipe thread machining process during pipe mounting and reduce the labor intensity of pipe mounting workers. Most of the existing external thread processing devices use an induction motor or a universal motor as the power source. Although the induction motor can meet the requirement of a rated power, the size and weight of the induction motor are too large, making the device bulky and heavy. The universal motor has reduced the size and weight while meeting a rated power, but it typically generates much noise and thus leads to bad user experience.

In view of this, the Chinese patent No. 201702474 U discloses an electric pipe threading machine. However, it still has the problem of large motor size and weight as well as noise.

SUMMARY

An objective of the present disclosure is to provide a bench pipe threading machine and a threading method to overcome the foregoing shortcomings in the prior art.

The present disclosure adopts the following technical solutions to solve the above problems. The bench pipe threading machine includes a spindle assembly, a die head assembly, a cutter assembly, a reamer assembly, a lifting handle assembly, and a frame assembly. The spindle assembly, the die head assembly, the cutter assembly, the reamer assembly, and the lifting handle assembly are all mounted on the frame assembly. The die head assembly, the cutter assembly, and the reamer assembly are respectively matched with the spindle assembly.

The frame assembly includes a frame mechanism and a carriage mechanism mounted on the frame mechanism. A transmission mechanism is mounted in the frame mechanism and connected to the spindle assembly. Both the spindle assembly and the lifting handle assembly are mounted on the frame mechanism. The die head assembly, the cutter assembly, and the reamer assembly are all mounted on the carriage mechanism.

The spindle assembly includes a front chuck, a rear chuck, a spindle, a hammering disc, a spindle gear, and a spindle bearing. The spindle gear is mounted at one end of the spindle, the front chuck is mounted on the spindle gear, and the rear chuck is mounted at the other end of the spindle. The hammering disc is mounted on the front chuck. The spindle bearing is sleeved on the spindle, and the spindle is mounted on the frame assembly through the spindle bearing.

Furthermore, the carriage mechanism includes a front guide pillar, a rear guide pillar, a carriage body, a carriage handle, carriage engagement teeth, and a carriage gear. Both the front guide pillar and the rear guide pillar are mounted on the frame mechanism. The carriage body is mounted on the front guide pillar and the rear guide pillar. The carriage handle is mounted on the carriage body. The carriage engagement teeth are arranged on the front guide pillar. The carriage gear is connected to the carriage handle. The carriage engagement teeth are engaged with the carriage gear. The die head assembly, the cutter assembly, and the reamer assembly are all mounted on the carriage body.

Furthermore, the bench pipe threading machine further includes a lithium battery assembly for supplying power to the bench pipe threading machine.

Furthermore, the die head assembly includes a die disc, a die, a curve disc, a retaining ring, a trigger mechanism, a locking block mechanism, a slider mechanism, and an adjustment eccentric shaft. The die is mounted on the die disc. The curve disc is mounted on the die disc through the retaining ring and matched with the die. The slider mechanism is matched with the die disc. The locking block mechanism is mounted on the slider mechanism. The adjustment eccentric shaft is mounted on the curve disc and matched with the locking block mechanism. The trigger mechanism is mounted on the die disc and matched with the slider mechanism, and the die disc is mounted on the frame assembly.

Furthermore, the slider mechanism includes a slider body, a slider reset spring, a slider buffer spring, a spring connection pillar, a spring ejection pillar, and a trigger limiting groove. The spring connection pillar is arranged on the slider body. One end of the slider reset spring and one end of the slider buffer spring are both connected to the spring connection pillar. Each of the other end of the slider reset spring and the other end of the slider buffer spring is connected to the spring ejection pillar, and the spring ejection pillar is arranged on the die disc. The trigger limiting groove is arranged on the slider body and matched with the trigger mechanism.

Furthermore, the locking block mechanism includes a locking block body, a locking block rotating shaft, a locking block positioning groove, a locking block positioning pillar, a locking block positioning spring, and a locking block adjustment groove. The locking block body is mounted on the slider mechanism through the locking block rotating shaft. The locking block positioning groove is arranged on the locking block body. The locking block positioning pillar is mounted on the slider mechanism through the locking block positioning spring and located in the locking block positioning groove. The locking block adjustment groove is arranged on the locking block body. The adjustment eccentric shaft is located in the locking block adjustment groove.

Furthermore, the trigger mechanism includes a trigger body, a trigger rotating shaft, a trigger torsion spring, and a trigger limiting pillar. The trigger body is mounted on the die disc through the trigger rotating shaft. The trigger torsion spring is sleeved on the trigger rotating shaft. The trigger torsion spring is provided with one end in contact with the die disc and the other end in contact with the trigger body. The trigger limiting column is provided with one end connected to the trigger body and the other end in contact with an end surface of the slider body or located in the trigger limiting groove.

Furthermore, the cutter assembly includes a cutter frame, a cutter seat, a cutter wheel, a cutter handle, and a cutter roller. The cutter seat, the cutter handle, and the cutter roller are all mounted on the cutter frame. The cutter wheel is mounted on the cutter seat and matched with the cutter roller. The cutter handle is in contact with the cutter seat. The cutter frame is mounted on the frame assembly.

Furthermore, the reamer assembly includes a reamer seat, a reamer cone, a reamer stop pin, a reamer retainer ring, a reamer pressure spring, a reamer handle, and a reamer rotating shaft. The reamer cone is mounted on the reamer seat. The reamer stop pin is mounted on the reamer seat through the reamer retainer ring. The reamer pressure spring is sleeved on the reamer stop pin. The reamer pressure spring is provided with one end in contact with the reamer seat and the other end in contact with the reamer stop pin. The reamer handle is mounted on the reamer stop pin. The reamer seat is mounted on the frame assembly through the reamer rotating shaft.

Furthermore, the lifting handle assembly includes a lifting handle, a lifting handle rod, a lifting handle seat, and a lifting handle positioning mechanism. The lifting handle is mounted on the lifting handle rod, the lifting handle rod is mounted on the lifting handle seat, and the lifting handle seat is matched with the lifting handle positioning mechanism.

Furthermore, another technical objective of the present disclosure is to provide a threading method using the bench pipe threading machine.

The foregoing technical objectives of the present disclosure are achieved through the following technical solutions.

The threading method of a bench pipe threading machine includes the following steps:

step one, preparation before work: placing a cutter assembly, a die head assembly, and a reamer assembly all at non-working positions; and inserting a pipe fitting to be processed into a spindle and a front chuck from a rear chuck, such that the pipe fitting is longer than the front chuck; and rotating a hammering disc in a screwing direction, pre-clamping the pipe fitting, screwing the rear chuck, such that the pipe fitting is concentric with a spindle gear, and forcibly rotating the hammering disc in the screwing direction, such that the front chuck clamps the pipe fitting;

step two, power-on check: pressing down a button switch to enable the switch to be in a closed state, such that a transmission motor drives two groups of transmission gears to rotate, one group of transmission gears drives a gear pump to rotate, a lubricating and cooling system starts to work, the other group of transmission gears drives the spindle gear to rotate, the spindle gear drives the front chuck, the rear chuck, the spindle, and the pipe fitting to rotate, and threading oil flows back into an oil pool of a machine body from a carriage body;

step three, pipe cutting work: placing a cutter assembly at a working position, rotating a cutter handle, such that the pipe fitting and a cutter wheel are at proper positions, rotating the cutter handle clockwise, such that the pipe fitting rotates and the cutter wheel cuts off the pipe fitting, so as to complete the pipe cutting work;

step four, inner angle chamfering work: placing the reamer assembly at a working position, rotating a reamer handle clockwise to enable a conical surface of a reamer cone and a conical surface of a reamer seat to be in contact with an inner hole edge of the pipe fitting, rotating the reamer handle clockwise, and forming a chamfer on the inner hole edge of the pipe fitting by the reamer cone; and step five, processing of external pipe threads: placing the die head assembly at a working position, pouring a lubricating and cooling liquid on a die from the die head assembly, rotating a carriage handle clockwise to enable an end surface of the pipe fitting to be in contact with the die, rotating the carriage handle clockwise, such that the pipe fitting rotates and the die processes threads on an outer wall of the pipe fitting; after the thread processing is completed, placing a trigger mechanism at an opening position, enabling a locking block mechanism to break away from the limit of the trigger mechanism to drive a curve disc to be in a disengaged state and the die to break away from the pipe fitting to complete the external thread processing; and rotating the carriage handle counterclockwise to separate the die head assembly from the pipe fitting, pushing a small handle on the curve disc to enable the trigger mechanism to be at a closed position and the curve disc to drive the die to be at a working position, so as to perform next processing of external pipe threads.

Compared with the prior art, the present disclosure has the following advantages:

1. The transmission motor is a switched reluctance motor, and the bench pipe threading machine is driven by the switched reluctance motor. The switched reluctance motor is provided with a control panel, so that the device can achieve protection in the aspects of overload, overcurrent, and the like.

2. An accessory mounted on the carriage mechanism can be used as a pipe joint connection device. That is, the pipe fitting having the processed external pipe threads is rotated on the device. A pipe joint is fixed on the accessory, and the carriage handle is rotated clockwise to enable the processed external pipe threads to be screwed into internal threads of the pipe joint. Due to the taper angles of the external pipe threads, the external pipe threads will screw into the internal threads of the pipe joint more tightly with each rotation. When a set torque is reached, a transmission motor will automatically stop running.

3. The output rotational speed of the spindle of the device is constant at 54 rpm, and the working efficiency thereof is at least 150% more than other devices. The device is supported by two sets of spindle bearings. The spindle bearings are deep groove ball bearings having seals. The spindle assembly runs smoothly with low noise and long life.

4. The switched reluctance motor can be directly connected to a power plug or can also be powered by a lithium battery assembly.

BRIEF DESCRIPTION OF THE DRAWINGS

FIG. 8 is an exploded view of a die head assembly according to an embodiment of the present disclosure.

FIG. 9A is a schematic diagram of an assembly structure of a die disc, a die, and a curve disc according to an embodiment of the present disclosure.

FIG. 9B is a stereogram of a die according to an embodiment of the present disclosure.

FIG. 10A is a left sectional view of a locking block body in a disabled state according to an embodiment of the present disclosure.

FIG. 10B is a left sectional view of a locking block body in an enabled state according to an embodiment of the present disclosure.

FIG. 10C is a front sectional view of a locking block body in an enabled state according to an embodiment of the present disclosure.

FIG. 14 is a sectional view of a cutter assembly according to an embodiment of the present disclosure.

FIG. 15 is an exploded view of a reamer assembly according to an embodiment of the present disclosure.

Figure 30:
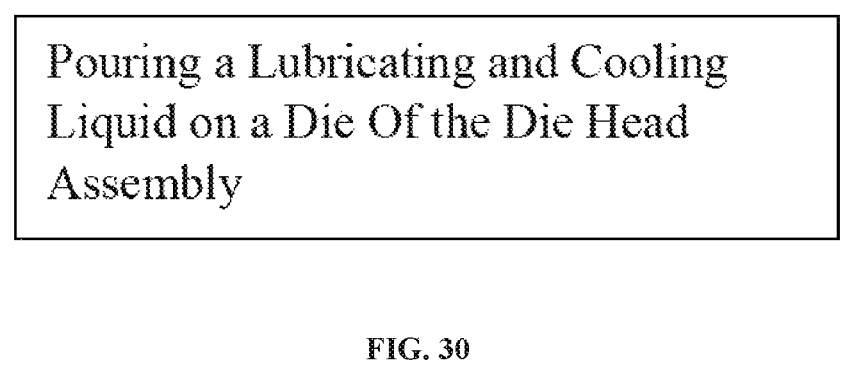

FIG. 30 schematically shows a feature of the present invention.

DETAILED DESCRIPTION OF THE EMBODIMENTS

Figure 1:
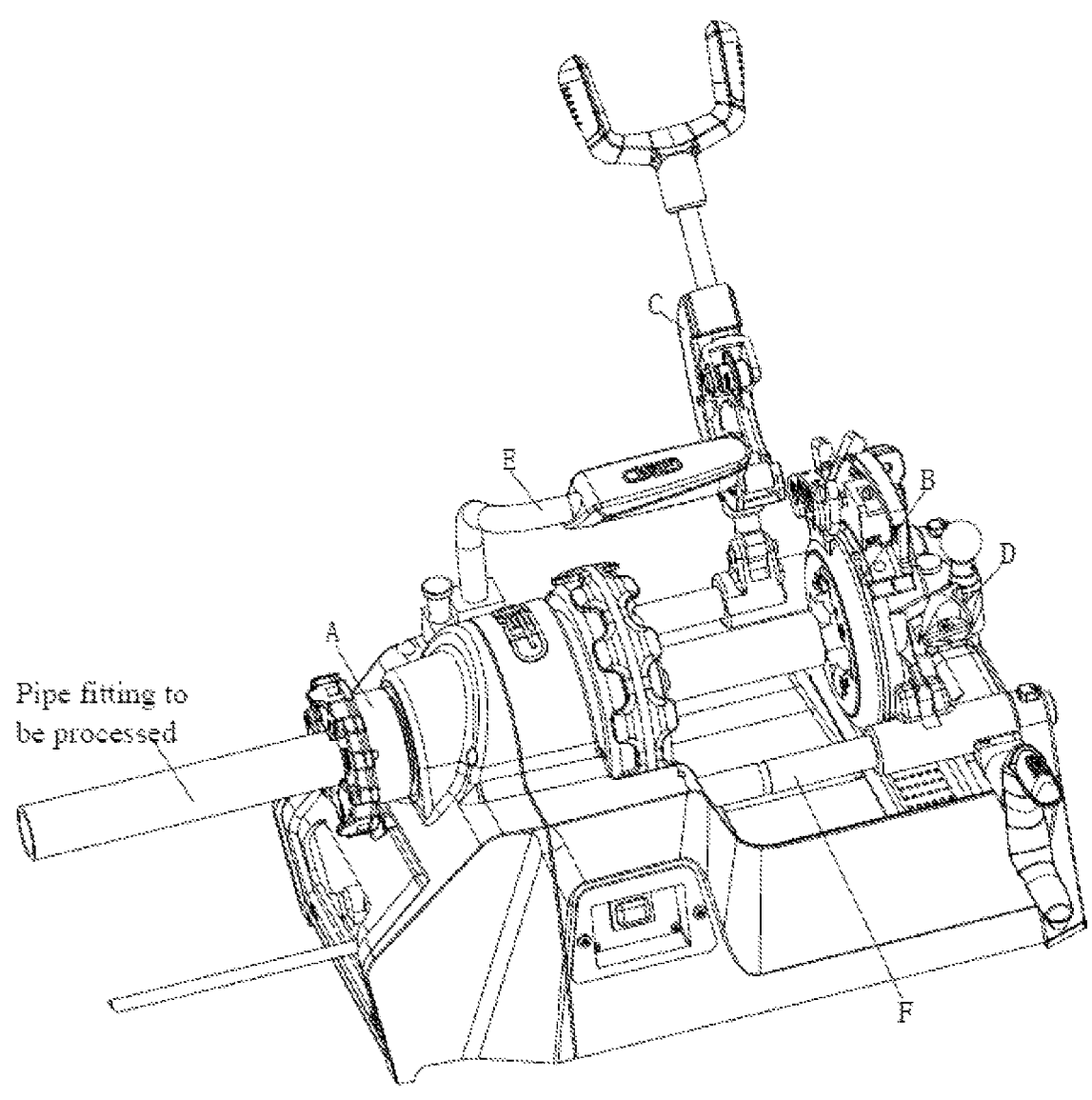
FIG. 1 is a stereogram of a bench pipe threading machine according to an embodiment of the present disclosure.
Figure 2:
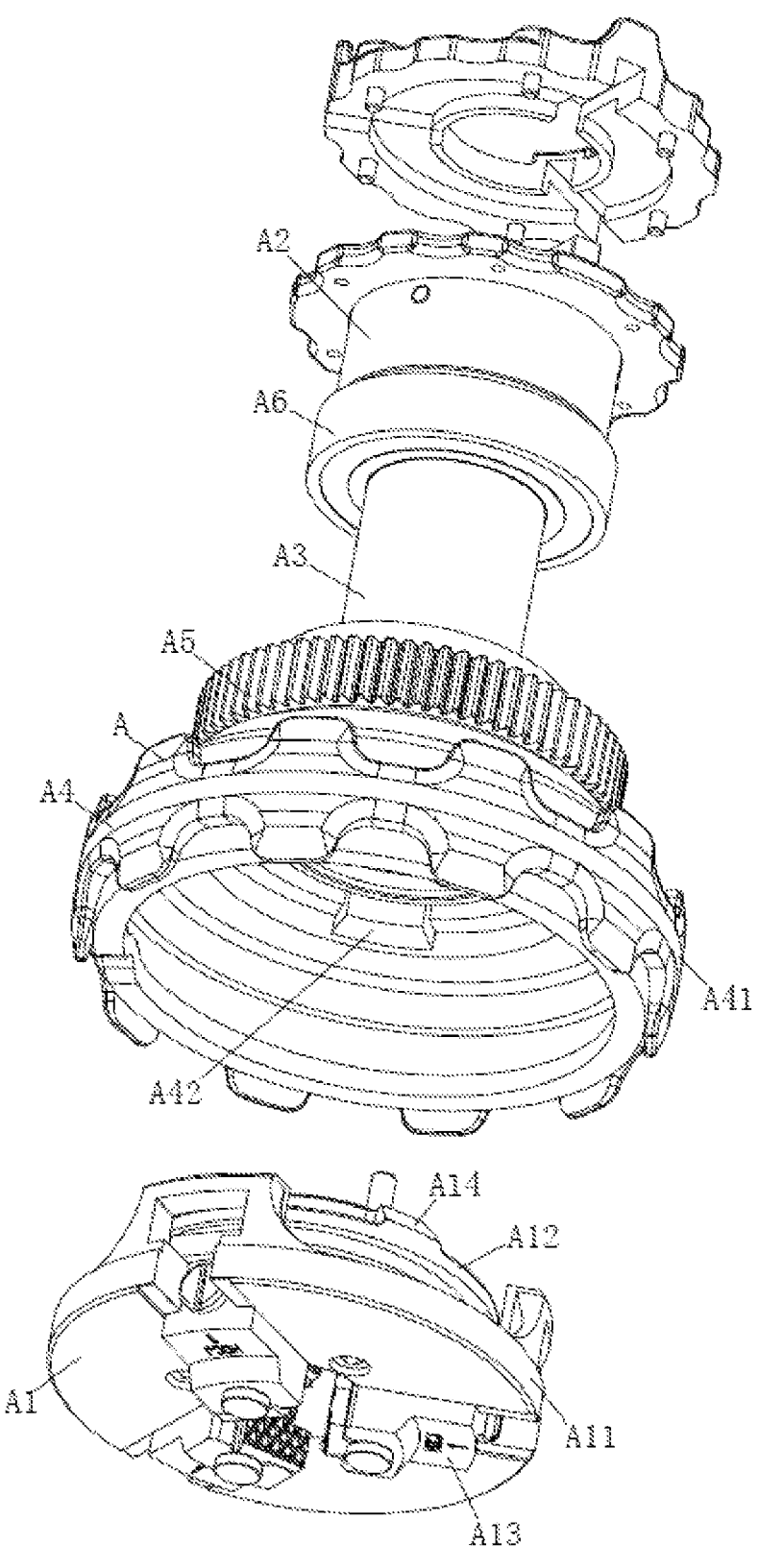
FIG. 2 is an exploded view of a spindle assembly according to an embodiment of the present disclosure.
Figure 3:
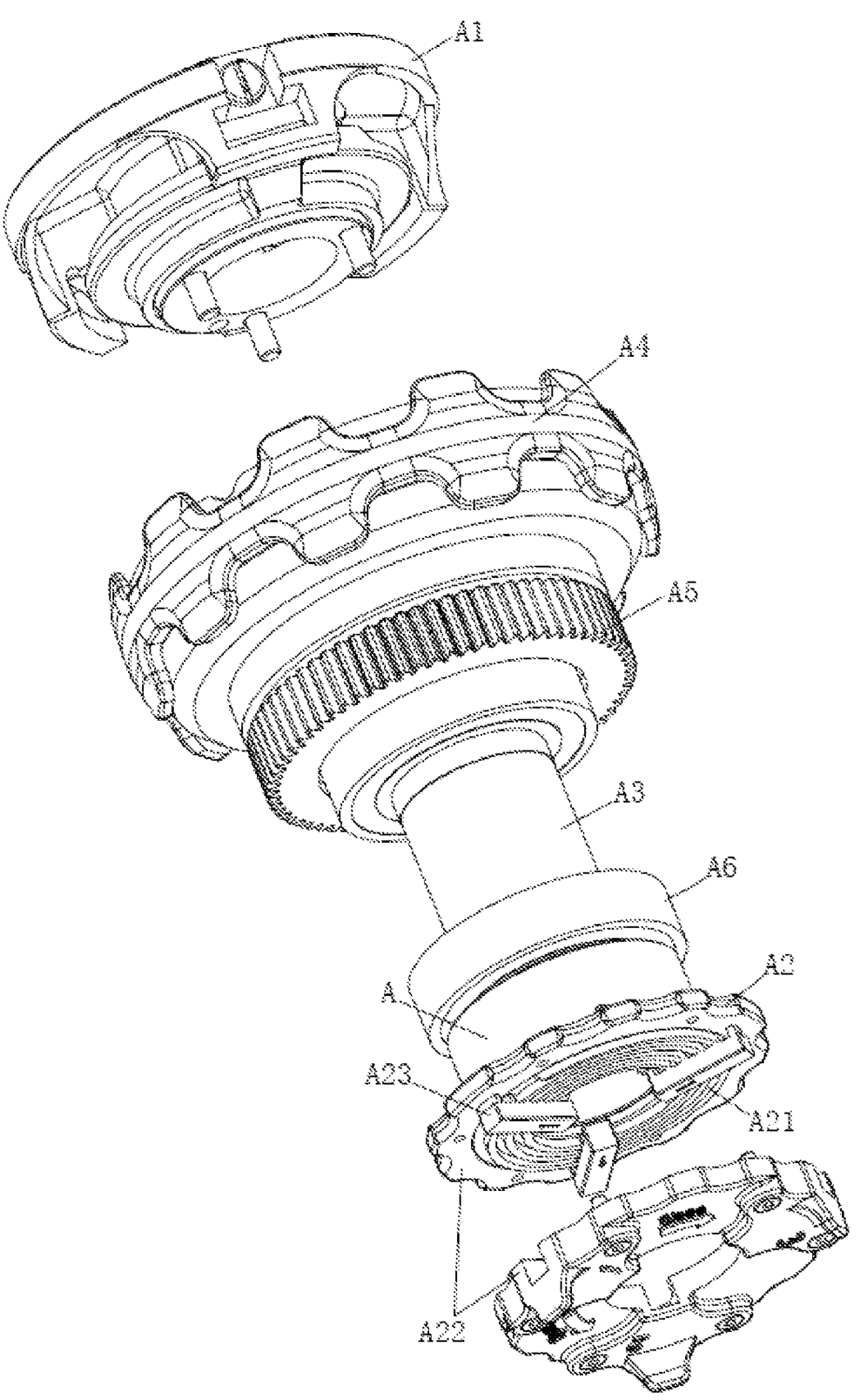
FIG. 3 is an exploded view of a spindle assembly according to an embodiment of the present disclosure.
Figure 4:
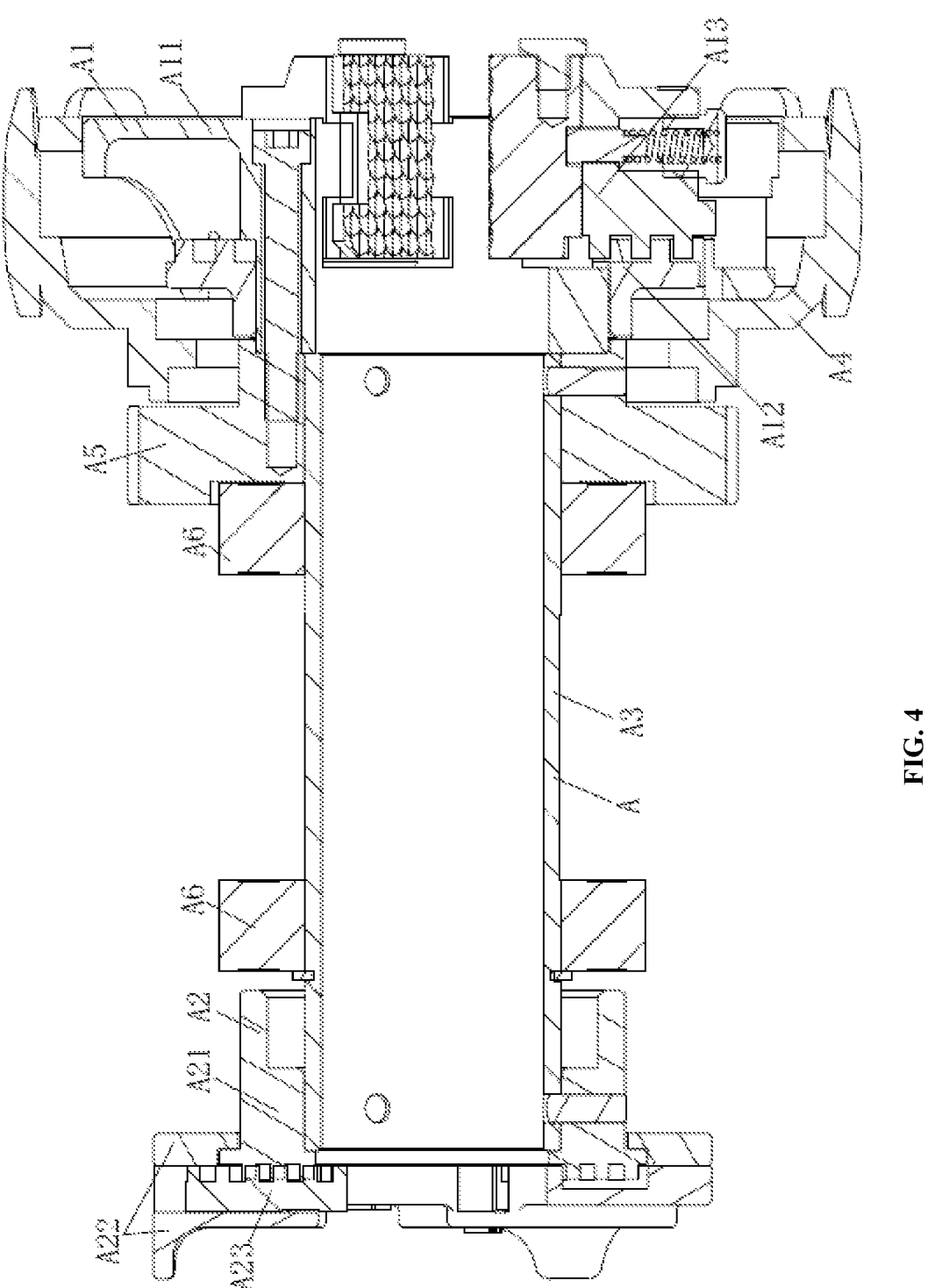
FIG. 4 is a sectional view of a spindle assembly according to an embodiment of the present disclosure.

The present disclosure is further described below in detail with reference to the accompanying drawings and the embodiments. The following embodiments describe the present disclosure, but the present disclosure is not limited to these embodiments.

Embodiment

Referring to FIG. 1 to FIG. 29, the structure, scale, size, and the like shown in the drawings of this specification are only used to match the content disclosed in the specification and for those skilled in the art to understand and read, which are not used to limit the limitations for implementing the present disclosure and thus are not technically substantial. Any structural modification, scaling relation change, or size adjustment made without affecting the effects and objectives that can be achieved by the present disclosure shall fall within the scope that can be encompassed by the technical content disclosed in the present disclosure.

In this embodiment, the bench pipe threading machine (as shown in FIG. 1) includes a spindle assembly A, a die head assembly B, a cutter assembly C, a reamer assembly D, a lifting handle assembly E, and a frame assembly F. The spindle assembly A, the die head assembly B, the cutter assembly C, the reamer assembly D, and the lifting handle assembly E are all mounted on the frame assembly F. The die head assembly B, the cutter assembly C, and the reamer assembly D are respectively matched with the spindle assembly A.

Figure 21:
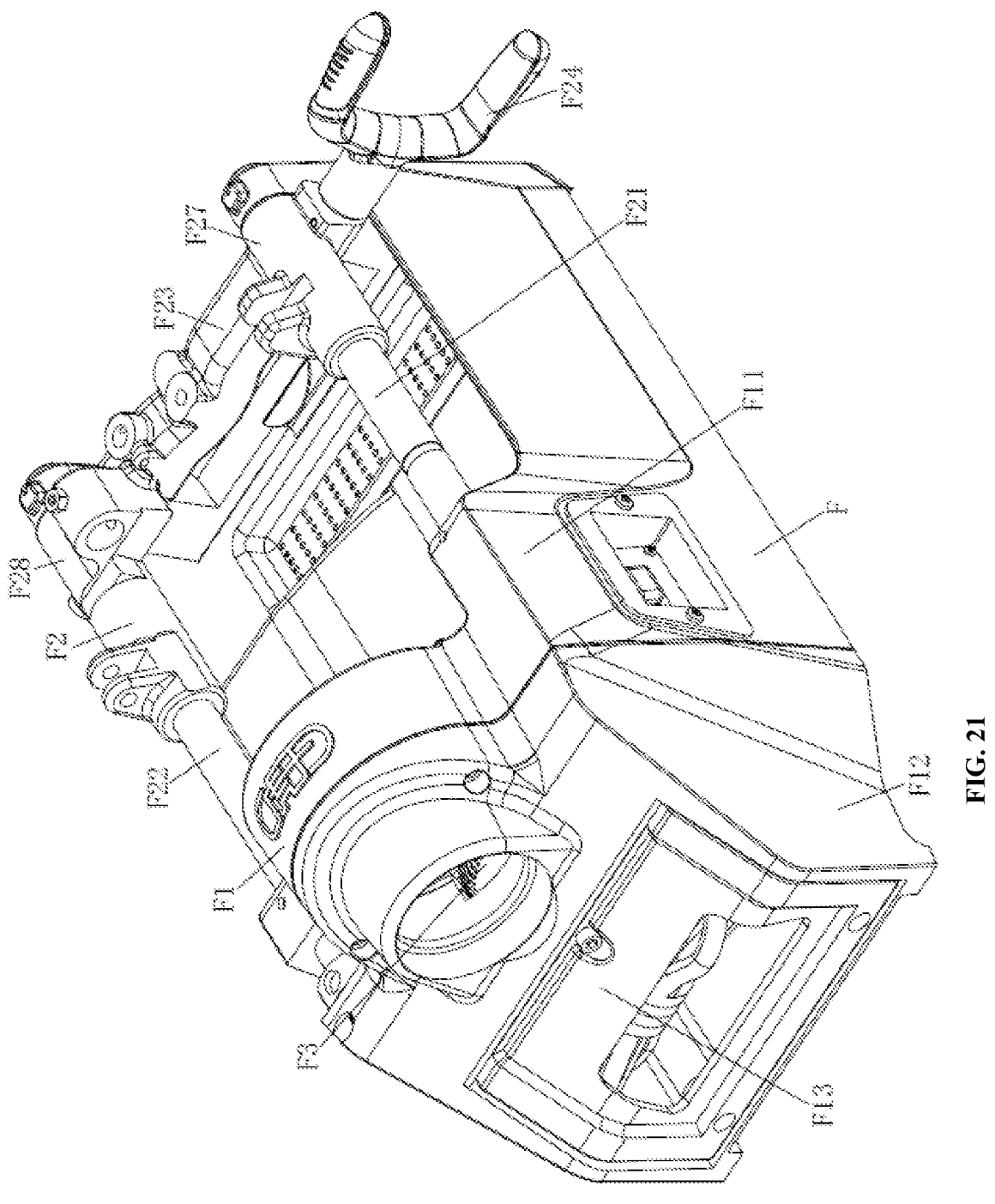
FIG. 21 is a stereogram of a frame assembly according to an embodiment of the present disclosure.
Figure 22:
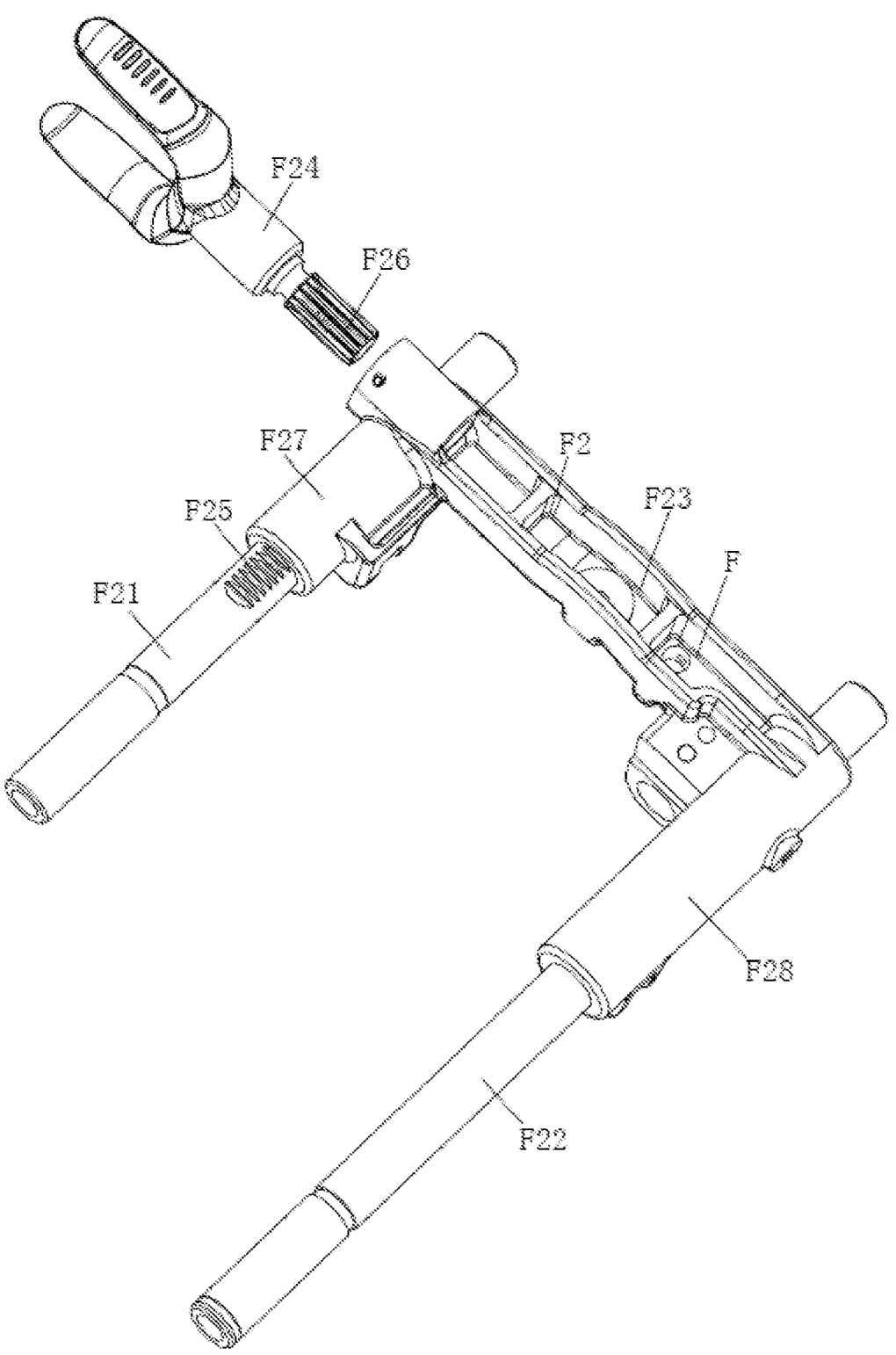
FIG. 22 is an exploded view of a carriage mechanism according to an embodiment of the present disclosure.
Figure 23:
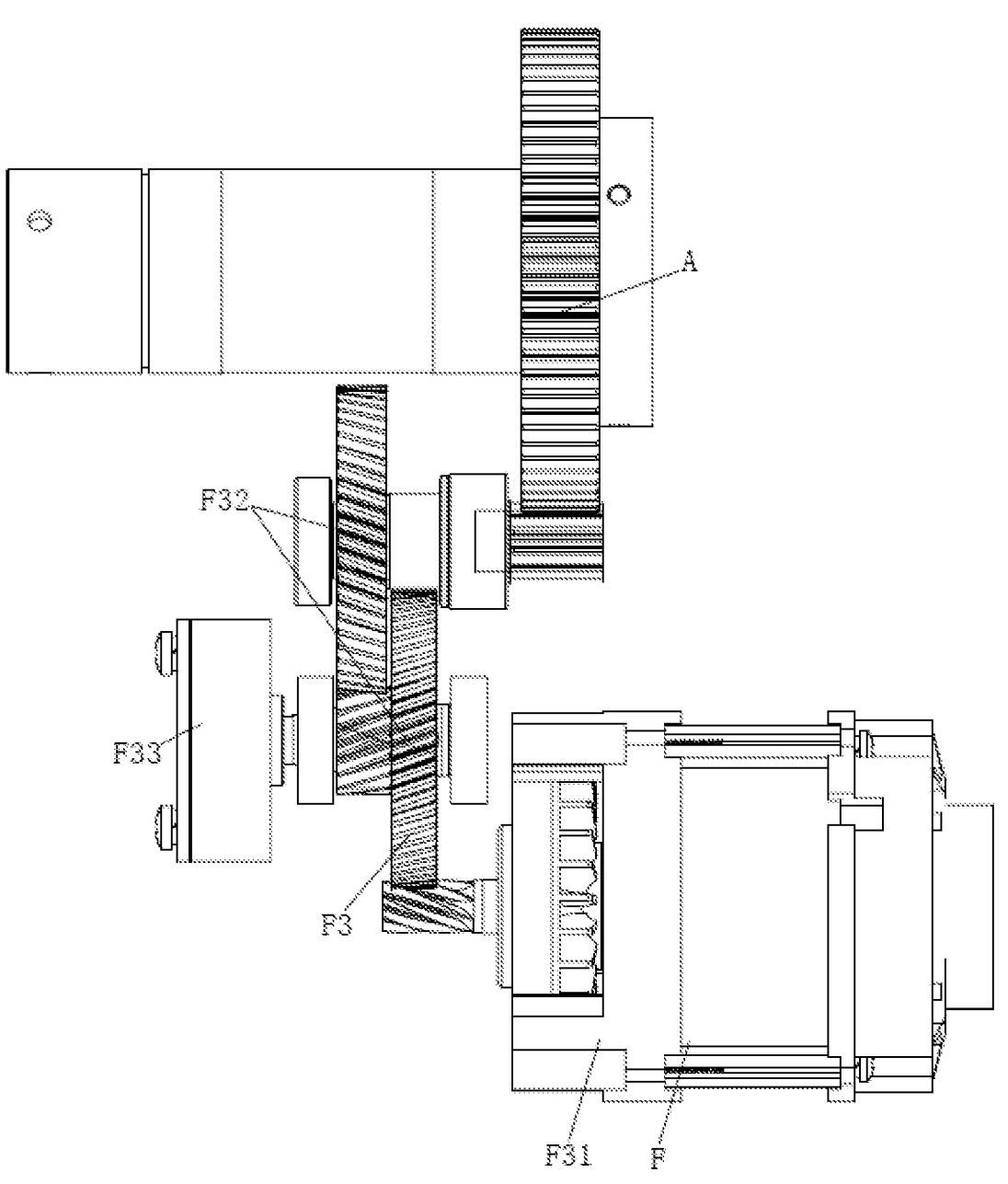
FIG. 23 is a connection view of a transmission mechanism according to an embodiment of the present disclosure.

In this embodiment, the frame assembly F (as shown in FIG. 21 to FIG. 23) includes a frame mechanism F1 and a carriage mechanism F2. The carriage mechanism F2 is mounted on the frame mechanism F1. A transmission mechanism F3 is mounted in the frame mechanism F1 and connected to the spindle assembly A for driving the spindle assembly A to rotate. Both the spindle assembly A and the lifting handle assembly E are mounted on the frame mechanism F1. The die head assembly B, the cutter assembly C, and the reamer assembly D are all mounted on the carriage mechanism F2.

In this embodiment, the carriage mechanism F2 includes a front (i.e., forward guide pillar F21, a rear (i.e., back) guide pillar F22, a carriage body F23, a carriage handle F24, carriage engagement teeth F25, and a carriage gear F26. Both the front guide pillar F21 and the rear guide pillar F22 are mounted on the frame mechanism F1. A front guide sleeve F27 and a rear guide sleeve F28 are respectively provided on both sides of the carriage body F23 and respectively sleeved on (e.g., receives) the front guide pillar F21 and the rear guide pillar F22. The carriage handle F24 is mounted on the carriage body F23. The carriage engagement teeth F25 are arranged on the front guide pillar F21. The carriage gear F26 is connected to the carriage handle F24. The carriage engagement teeth F25 are engaged with the carriage gear F26. The die head assembly B, the cutter assembly C, and the reamer assembly D are all mounted on the carriage body F23.

In this embodiment, the frame mechanism F1 includes a main machine body F11, a secondary machine body F12, and a machine body cover plate F13. The secondary machine body F12 is mounted on the main machine body F11, the machine body cover plate F13 is mounted on the secondary machine body F12, and both the front guide pillar F21 and the rear guide pillar F22 are mounted on the main machine body F11.

In this embodiment, the transmission mechanism F3 includes a transmission motor F31, two groups of transmission gears F32, and a gear pump F33. The two groups of transmission gears F32 are engaged with each other. The transmission motor F31 is engaged with one group of transmission gears F32, and the gear pump F33 is connected to the transmission gears F32. The other group of transmission gears F32 is engaged with the spindle assembly A. The transmission motor F31 is a switched reluctance machine and controlled through a motor control panel F34. Both the transmission motor F31 and the motor control panel F34 are mounted in a space between the main machine body F11 and a machine body bottom plate F14. An air inlet window F15 and an air outlet window F16 are provided on the machine body bottom plate F14.

Specifically, the transmission motor F31 is a switched reluctance machine and is a key core component of the device. The transmission motor F31 is connected to the motor control panel, and the two are fixedly mounted on the main machine body F11 through screws. The bottom plate is mounted on the main machine body F11, so that the transmission motor F31 and the motor control panel are located in the space defined by the main machine body F11 and the bottom plate. When the transmission motor F31 runs, blades on a motor rotor assembly that rotates at a high speed can drive air in the space defined by the main machine body F11 and the bottom plate to form airflow. Air outside the device passes through the space defined by the main machine body F11 and the bottom plate from the air inlet window F15 on the bottom plate and then is exhausted outside the device from the air outlet window F16 on the bottom plate, so as to achieve the purpose of dissipating heat from the transmission motor F31 and the motor control panel.

Figure 27:
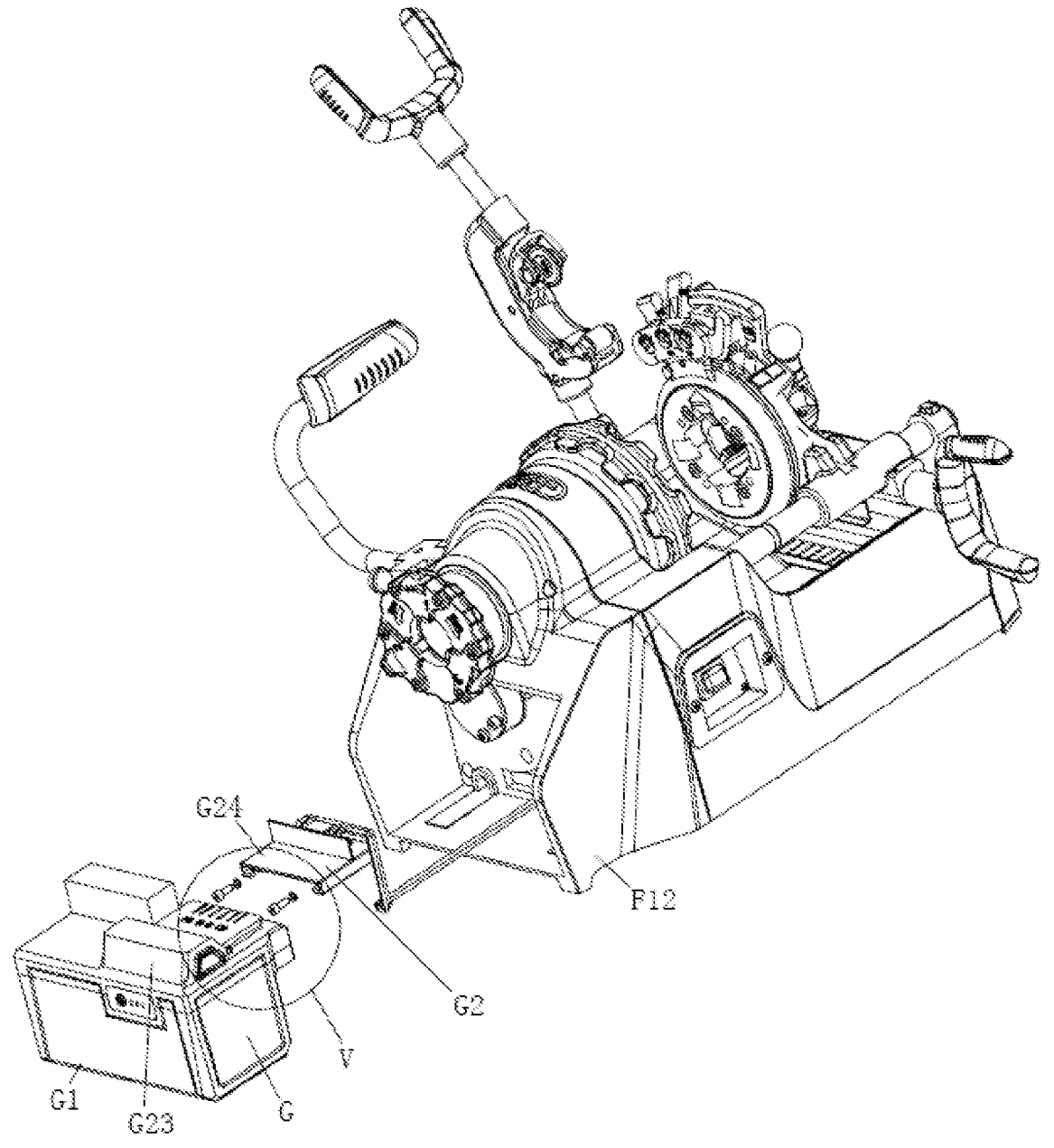
FIG. 27 is an exploded view of a lithium battery mechanism according to an embodiment of the present disclosure.
Figure 28:
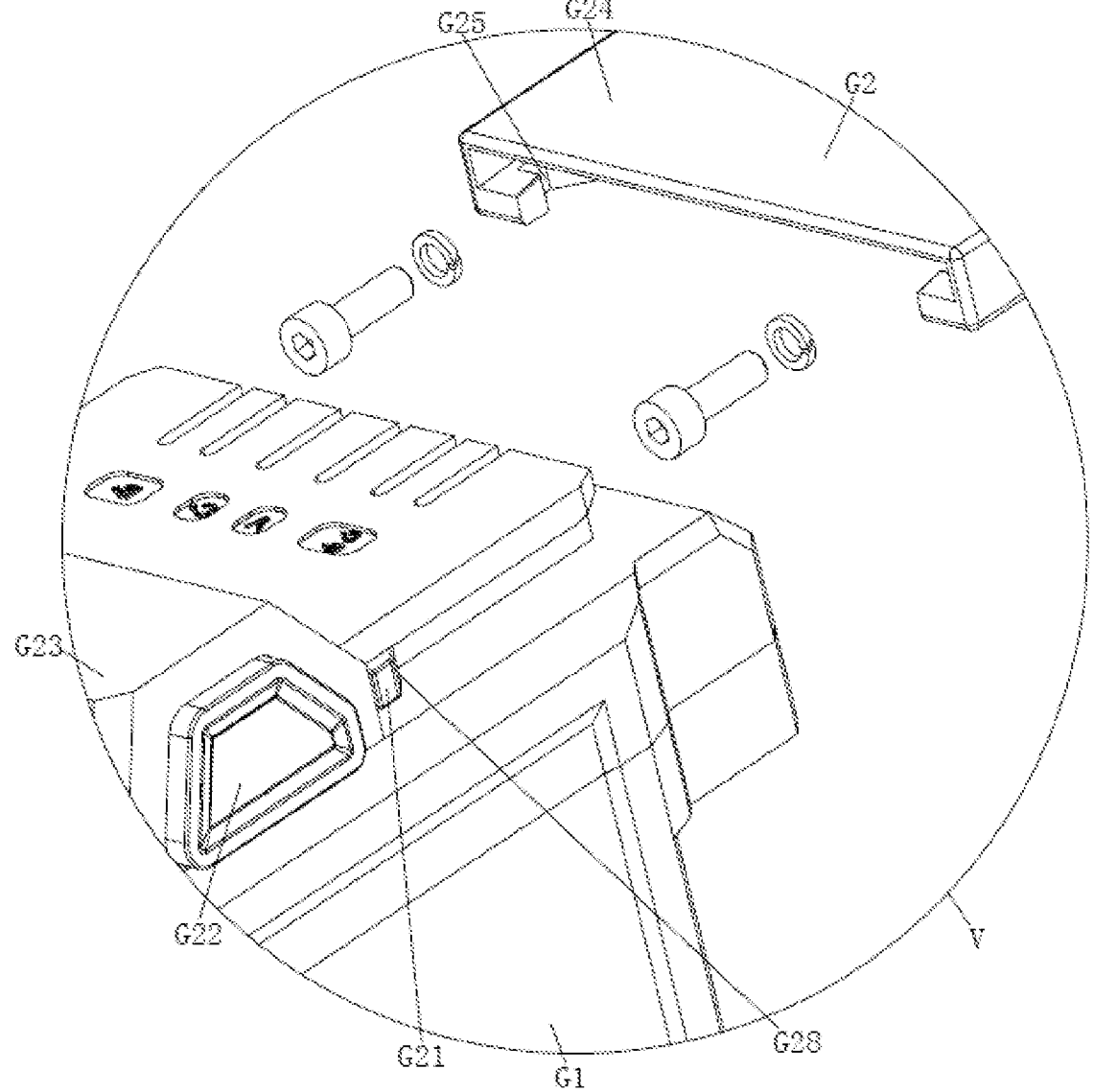
FIG. 28 is an enlarged view of a part V in FIG. 27.
Figure 29:
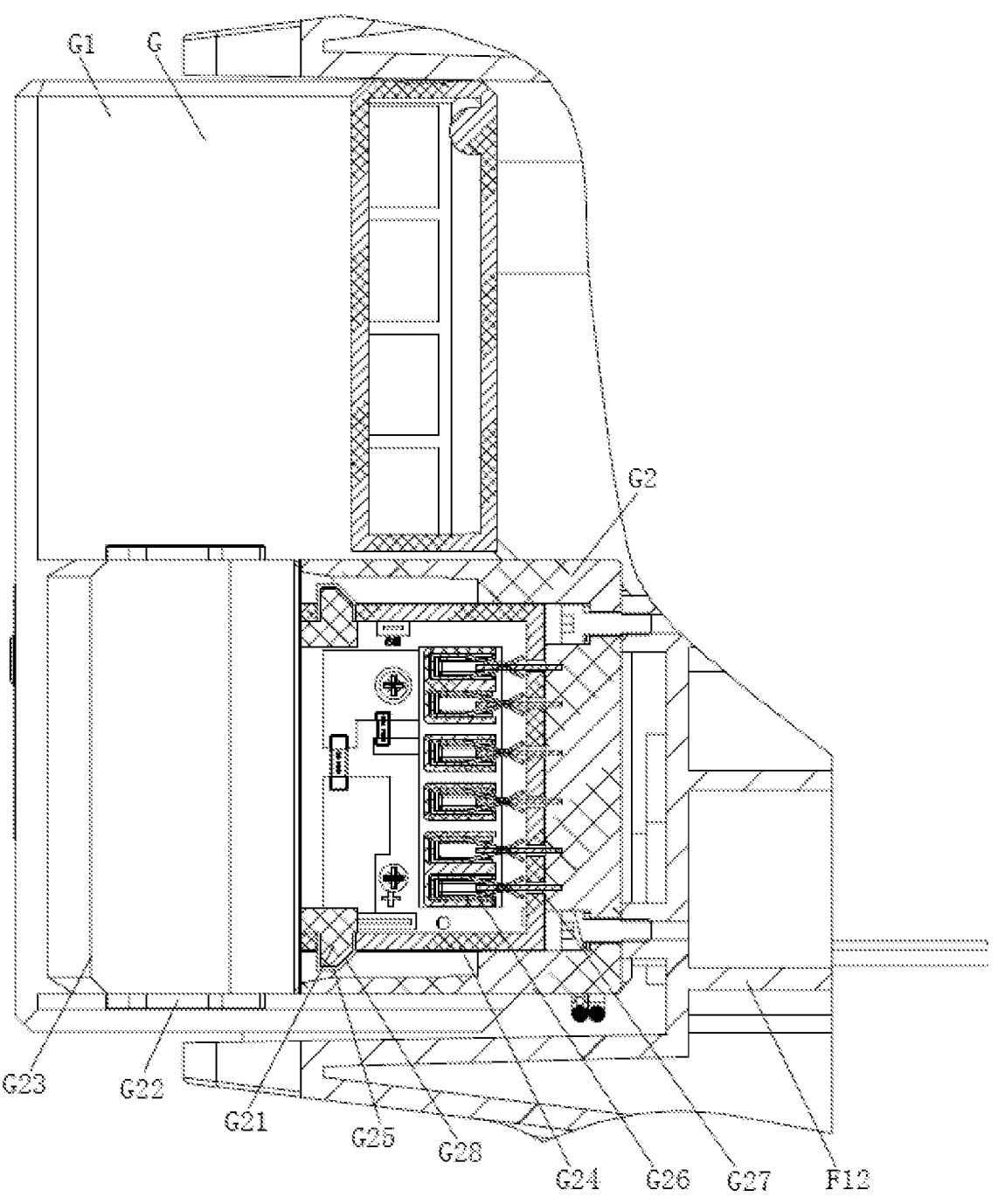
FIG. 29 is a local view of a lithium battery assembly according to an embodiment of the present disclosure.

The switched reluctance machine used in the bench pipe threading machine can be divided into two types, namely a lithium battery type and an ordinary battery type according to different power supplies. The lithium battery type is specifically structured as follows (as shown in FIG. 27 to FIG. 29). A plug device G2 is fixed on the secondary machine body F12 through two M4X12 hexagon socket cap screws, and a lithium battery body G1 is connected to buckle slots G25 through two buckle bodies G21 thereon. During connection, male tabs G27 are inserted into female tabs G26, and then a power line welded on a plug assembly supplies power to the switched reluctance machine F31.

The lithium battery type bench pipe threading machine uses a lithium battery assembly G for the bench pipe threading machine. The lithium battery assembly G includes the lithium battery body G1 and the plug device G2, and the lithium battery body G1 is mounted on the secondary machine body F12 through the plug device G2.

In this embodiment, the plug device G2 includes the buckle bodies G21, buckle buttons G22, a button seat G23, a buckle mounting base G24, the buckle slots G25, the female tabs G26, the male tabs G27, and buckle pressure springs for clamping the buckle bodies G21 into the buckle slots G25. The female tabs G26 are arranged on the lithium battery body G1, the male tabs G27 are arranged on the secondary machine body F12, and the female tabs G26 are matched with the male tabs G27.

In this embodiment, the buckle bodies G21 are fixed to the buckle buttons G22. The buckle buttons G22 are mounted on the button seat G23. The button seat G23 is disposed on the lithium battery body G1. The buckle mounting base G24 is mounted on the secondary machine body F12 through a bolt and a washer. The buckle slots G25 are formed in the buckle mounting base G24. The buckle bodies G21 are matched with the buckle slots G25. The buckle pressure springs are mounted in the button seat G23. Both ends of the buckle pressure springs respectively abut against the buckle buttons G22 and the button seat G23.

In this embodiment, the male tabs G27 are arranged on the buckle mounting base G24. The buckle bodies G21 and the buckle buttons G22 are arranged as an integral structure. There are two buckle buttons G22 symmetrically mounted on both sides of the button seat G23, and the buckle bodies G21 are provided with inclined guide surfaces G28.

The lithium battery body G1 of the lithium battery assembly G is mounted on the secondary machine body F12 through the plug device G2. When the lithium battery body G1 is mounted, the buckle bodies G21 are clamped into the buckle slots G25 through the buckle pressure springs, and the female tabs G26 are connected to the male tabs G27. The lithium battery assembly can supply power to the bench threading machine. When the lithium battery body G1 is removed, the buckle buttons G22 are pressed to make the buckle pressure springs in a compressed state, so that the buckle bodies G21 are separated from the buckle slots G25, and the lithium battery body G1 can be removed. When the lithium battery assembly supplies power to the bench threading machine, the bench threading machine can easily work when having no power line, and it is only necessary to replace the lithium battery assembly during use.

In the ordinary bench pipe threading machine, a power line having a plug is positioned in the space between the secondary machine body F12 and the machine body cover plate F13. When working, the power line having a plug is pulled out and inserted into a corresponding socket. When the work is completed, the power line having a plug can be received into the space between the secondary machine body F12 and the machine body cover plate F13.

When the frame assembly is used, the carriage handle F24 is rotated. The front guide sleeve F27 and the rear guide sleeve F28 are respectively sleeved on the front guide pillar F21 and the rear guide pillar F22, and the carriage engagement teeth F25 are engaged with the carriage gear F26, so that when the carriage handle F24 is rotated, the carriage body F23 can move along the direction of the front guide pillar F21 and the rear guide pillar F22 to process a pipe fitting.

In this embodiment, the spindle assembly A (as shown in FIG. 2 to FIG. 5) includes a front chuck A1, a rear chuck A2, a spindle A3, a hammering disc A4, a spindle gear A5, and a spindle bearing A6. The front chuck A1 is mounted at one end of the spindle A3. The spindle gear A5 is mounted on the spindle A3. The front chuck A1 is mounted on the spindle gear A5. The rear chuck A2 is mounted at the other end of the spindle A3. The hammering disc A4 is mounted on the front chuck A1. The spindle bearing A6 is sleeved on the spindle A3. The spindle A3 is mounted on the frame assembly F through the spindle bearing A6, and the spindle gear A5 is engaged with the transmission gear F32.

In this embodiment, the front chuck A1 includes a front chuck body A11, a front clamping disc A12, a front clamping block A13, and a front clamping disc hammering block A14. The front chuck body A11 is mounted on the spindle gear A5. Both the front clamping disc A12 and the front clamping block A13 are mounted on the front chuck body A11. The front clamping block A13 is matched with the front clamping disc A12. The front clamping disc A12 is matched with the hammering disc A4. The front clamping disc hammering block A14 is arranged on the front clamping disc A12.

In this embodiment, the hammering disc A4 includes a hammering disc body A41 and a hammering disc hammering block A42. The hammering disc hammering block A42 is arranged on the hammering disc body A41 and matched with the front clamping disc hammering block A14.

In this embodiment, the rear chuck A2 includes a rear chuck body A21, a rear clamping disc A22, and a rear clamping block A23. The rear chuck body A21 is mounted on the spindle A3. Both the rear clamping disc A22 and the rear clamping block A23 are mounted on the rear chuck body A21. The rear clamping disc A22 is matched with the rear clamping block A23, and the rear clamping block A23 is matched with the rear chuck body A21.

Specifically, the spindle bearing A6 supports the front chuck A1, the rear chuck A2, and the spindle A3. The spindle bearing A6 is a deep groove ball bearing. The front chuck A1 and the spindle A3 are fixed by three hexagon socket cap screws (M6X45), and the rear chuck A2 and the spindle A3 are fixed by three slot pins 5X14 of B-type semi-long taper slots. When the hammering disc A4 is rotated in the screwing direction, the front clamping block A13 in the front chuck body A11 moves to the center to clamp a pipe fitting to be processed. When the hammering disc A4 is rotated in the unscrewing direction, the front clamping block A13 in the front chuck body A11 moves away from the center to loosen the pipe fitting. Meanwhile, the rear clamping disc A22 is rotated, so that the rear clamping block A23 can move to the center or periphery of the spindle A3 on the rear chuck body A21 to fasten or loosen the pipe fitting.

In this embodiment, the die head assembly B (as shown in FIG. 6 to FIG. 12B) includes a die disc B1, a die B2, a curve disc B3, a retaining ring B4, a trigger mechanism B5, a locking block mechanism B6, a slider mechanism B7, and an adjustment eccentric shaft B8. Both the die B2 and the curve disc B3 are mounted on the die disc B1, and the curve disc B3 is matched with the die B2. Generally, the curve disc B3 is mounted on the die disc B1 through the retaining ring B4. The slider mechanism B7 is matched with the die disc B1. The locking block mechanism B6 is mounted on the slider mechanism B7. The adjustment eccentric shaft B8 is mounted on the curve disc B3 and matched with the locking block mechanism B6. The trigger mechanism B5 is mounted on the die disc B1 and matched with the slider mechanism B7, and the die disc B1 is provided with one side hinged to the rear guide sleeve F28 and the other side is erected on the front guide sleeve F27.

In this embodiment, the slider mechanism B7 includes a slider body B71, a slider reset spring B72, a slider buffer spring B73, a spring connection pillar B74, a spring ejection pillar B75, and a trigger limiting groove B76. The spring connection pillar B74 is arranged on the slider body B71, one end of the slider reset spring B72 and one end of the slider buffer spring B73 are both connected to the spring connection pillar B74, each of the other end of the slider reset spring B72 and the other end of the slider buffer spring B73 is connected to the spring ejection pillar B75, and the spring ejection pillar B75 is arranged on the die disc B1. The trigger limiting groove B76 is arranged on the slider body B71 and matched with the trigger mechanism B5.

In this embodiment, the locking block mechanism B6 includes a locking block body B61, a locking block rotating shaft B62, a locking block positioning groove B63, a locking block positioning pillar B64, a locking block positioning spring B65, and a locking block adjustment groove B66. The locking block body B61 is mounted on the slider mechanism B7 through the locking block rotating shaft B62. The locking block positioning groove B63 is arranged on the locking block body B61. The locking block positioning pillar B64 is mounted on the slider mechanism B7 through the locking block positioning spring B65 and located in the locking block positioning groove B63. The locking block adjustment groove B66 is arranged on the locking block body B61, and the adjustment eccentric shaft B8 is located in the locking block adjustment groove B66.

In this embodiment, the trigger mechanism B5 includes a trigger body B51, a trigger rotating shaft B52, a trigger torsion spring B53, and a trigger limiting pillar B54. The trigger body B51 is mounted on the die disc B1 through the trigger rotating shaft B52. The trigger torsion spring B53 is sleeved on the trigger rotating shaft B52. The trigger torsion spring B53 is provided with one end in contact with the die disc B1 and the other end in contact with the trigger body B51. The trigger limiting column B54 is provided with one end connected to the trigger body B51 and the other end in contact with an end surface of the slider body B71 or located in the trigger limiting groove B76.

In this embodiment, the die disc B1 includes a die disc body B11 and a die mounting groove B12. The die mounting groove B12 is arranged on the die disc body B11. The die B2 includes a die body B21 and a curve groove B22. The curve groove B22 is arranged on the die body B21. The curve disc B3 includes a curve disc body B31 and a curve boss B32. The curve boss B32 is arranged on the curve disc body B31. The die body B21 is mounted in the die mounting groove B12. The curve boss B32 is located in the curve groove B22.

Specifically, the die head assembly has a fine adjustment function. As shown in FIG. 8, a support shaft assembly is mounted fixedly on the die disc B1 and the retaining ring B4 is mounted fixedly on the die disc B1 through hexagon socket cap screws. The curve disc B3 is hinged to a small cylinder of the retaining ring B4. The slider mechanism B7 is mounted on the die disc B1 in a limiting manner. The curve disc B3 and the locking block mechanism B6 are axially limited by the retaining ring B4 between the retaining ring B4 and the die disc B1. The trigger body B51 and the trigger torsion spring B53 are hinged to the die disc B1 through the trigger rotating shaft B52, and the trigger torsion spring B53 ensures the opening and closed positions of the trigger body B51. The adjustment eccentric shaft B8 is mounted in a corresponding hole of the curve disc B3 and positioned by a hexagon socket cap screw.

As shown in FIG. 9A to FIG. 9D, the die body B21 is mounted in the die mounting groove B12, and the curve groove B22 is tangential to the curve boss B32. The curve disc body B31 rotates around the center as shown by the arrow in FIG. 9A within a specified range and drives the die body B21 to perform a linear reciprocating motion in the die mounting groove B12 as shown by the arrow in FIG. 9A. When the trigger body B51 is at the closed position and the locking block body B61 drives the curve disc body B31 to be in the working state, the die body B21 is locked at a position that specifies the size of the pipe fitting to be processed, and external threads of the pipe fitting can be processed. After the thread processing is completed, one end of the pipe fitting pushes away the trigger body B51, so that the trigger body B51 is located at the opening position, the locking block body B61 breaks away from the limit of the trigger body B51 and quickly drives the curve disc body B31 to be in the disengaged state, and the die body B21 is quickly separated from the processed pipe fitting to complete the external thread processing once.

As shown in FIG. 10A to FIG. 10C, the locking block is activated. As shown in FIG. 10B, a small eccentric cylinder in the adjustment eccentric shaft B8 is in a tangential connection state with the locking block adjustment groove B66 of the locking block body B61, and a fine adjustment indicator on the curve disc body B31 is as shown in FIG. 10C. The hexagon socket cap screw is loosened, and the adjustment eccentric shaft B8 is rotated to make the curve disc body B31 rotate slightly, so that the die body B21 slightly moves in the die mounting groove B12 in the die disc body B11, and the fine adjustment of the outer diameter of the processed pipe fitting is achieved.

Figure 11:
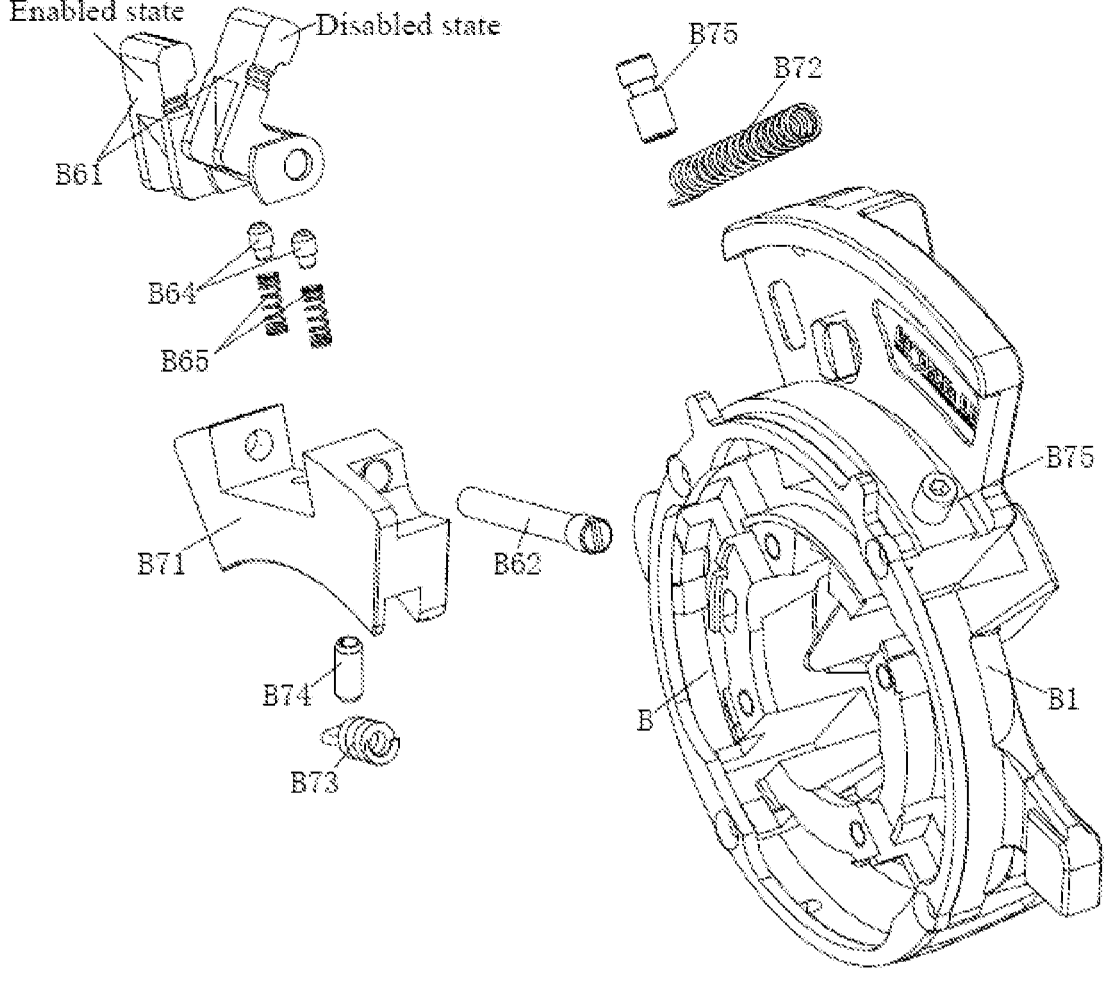
FIG. 11 is an exploded view of a locking block mechanism and a slider mechanism according to an embodiment of the present disclosure.
Figure 12A:
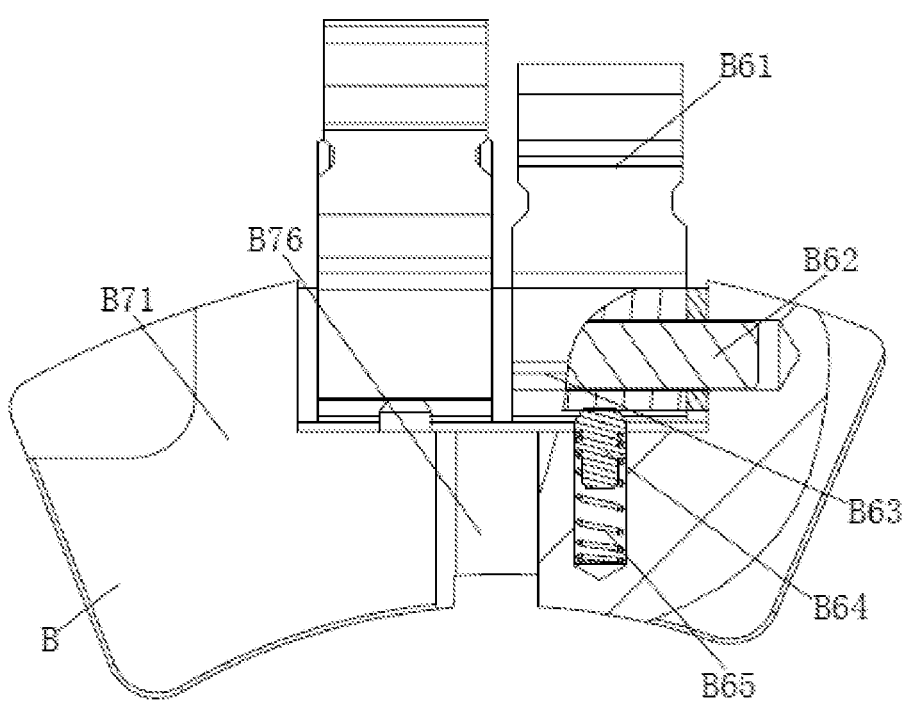
FIG. 12A is a front view of a locking block mechanism and a slider mechanism according to an embodiment of the present disclosure.
Figure 12B:
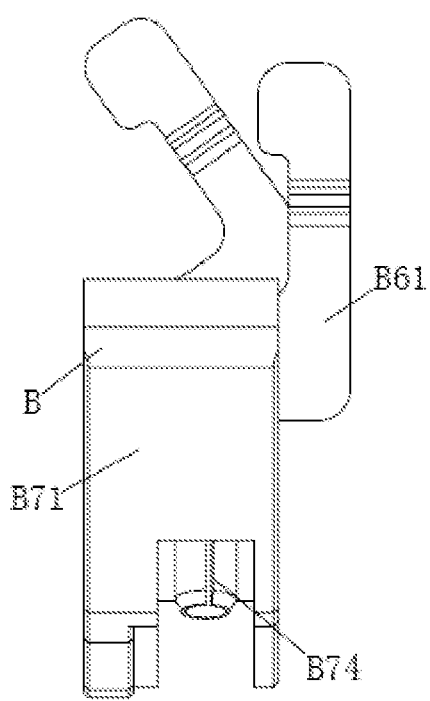
FIG. 12B is a left view of a locking block mechanism and a slider mechanism according to an embodiment of the present disclosure.

As shown in FIG. 11, there are two locking block bodies B61, namely an enabled locking block body and a disabled locking block body. The locking block bodies B61 are hinged to the slider body B71 through the locking block rotating shaft B62. The enabled locking block body and the disabled locking block body are positioned through the locking block positioning pillar B64 and the locking block positioning spring B65. The spring connection pillar B74 is a heavy-duty straight groove cylindrical elastic pin 6X14 fixedly mounted on the slider body B71, which is sleeved with the slider buffer spring B73. The slider reset spring B72 is fixedly mounted on the die disc body B11 and sleeved on the same.

Figure 13:
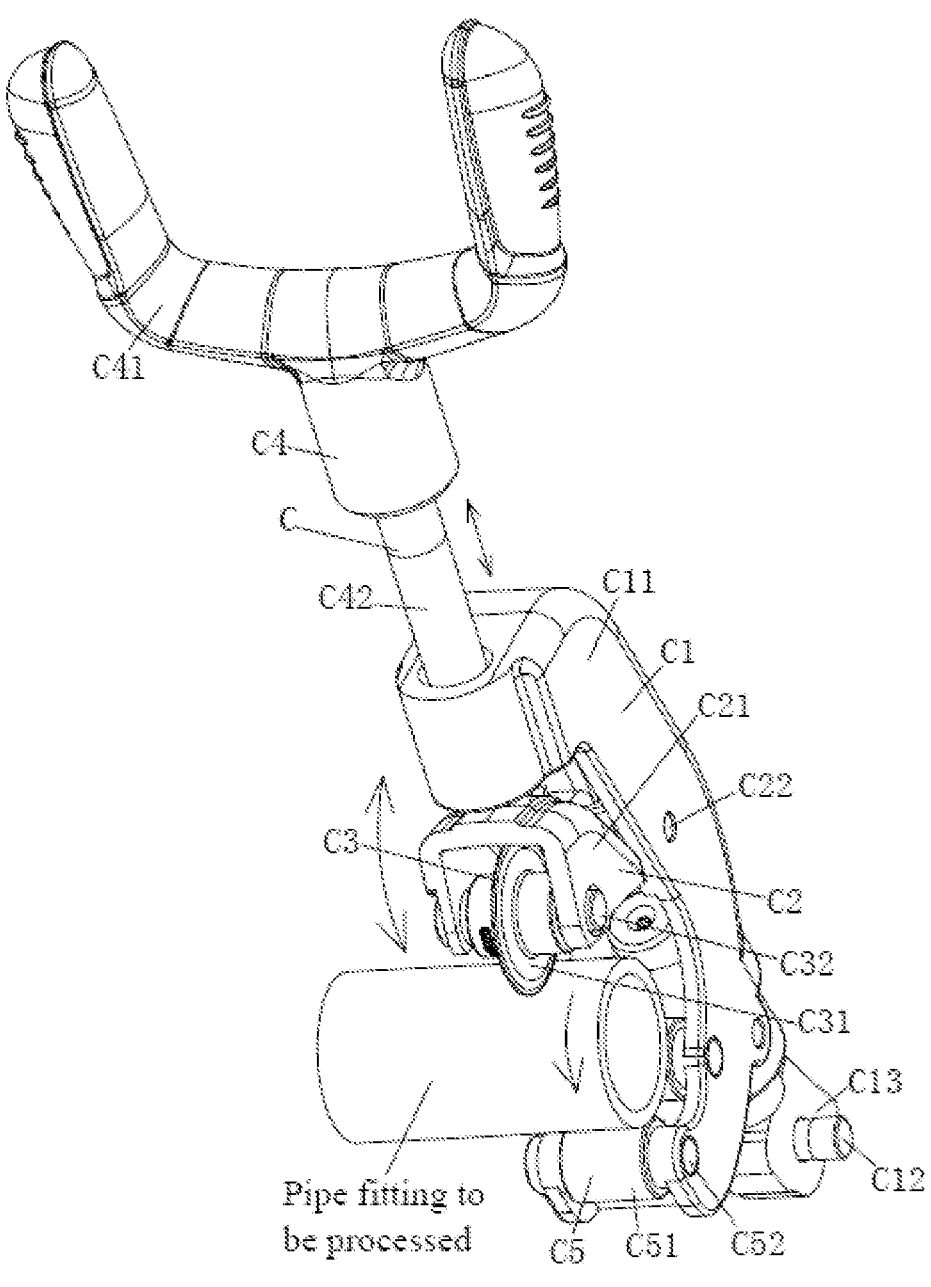
FIG. 13 is a stereogram of a cutter assembly according to an embodiment of the present disclosure.

In this embodiment, the cutter assembly C (as shown in FIG. 13 and FIG. 14) includes a cutter frame C1, a cutter seat C2, a cutter wheel C3, a cutter handle C4, and a cutter roller C5. The cutter seat C2, the cutter handle C4, and the cutter roller C5 are all mounted on the cutter frame C1. The cutter wheel C3 is mounted on the cutter seat C2 and matched with the cutter roller C5. The cutter handle C4 is in contact with the cutter seat C2, and the cutter frame C1 is mounted on the rear guide sleeve F28.

In this embodiment, the cutter frame C1 includes a cutter frame body C11, a cutter frame rotating shaft C12, and a cutter frame support shaft C13. The cutter frame support shaft C13 is mounted on the cutter frame body C11 and is mounted on the rear guide sleeve F28 through the cutter frame rotating shaft C12.

In this embodiment, the cutter seat C2 includes a cutter seat body C21, a cutter seat rotating shaft C22, and a cutter seat torsion spring C23. The cutter seat body C21 is mounted on the cutter frame C1 through the cutter seat rotating shaft C22. The cutter seat torsion spring C23 is sleeved on the cutter seat rotating shaft C22 and the cutter seat torsion spring C23 is provided with one end in contact with the cutter seat body C21 and the other end in contact with the cutter frame C1.

In this embodiment, the cutter wheel C3 includes a cutter body C31 and a cutter rotating shaft C32. The cutter body C31 is mounted on the cutter seat C2 through the cutter rotating shaft C32.

In this embodiment, the cutter handle C4 includes a cutter handle body C41 and a cutter handle screw C42. The cutter handle body C41 is mounted at one end of the cutter handle screw C42, the other end of the cutter handle screw C42 is in contact with the cutter seat C2, and the cutter handle screw C42 is mounted on the cutter frame C1.

In this embodiment, the cutter roller C5 includes a cutter roller body C51 and a cutter roller rotating shaft C52. The cutter roller body C51 is mounted on the cutter frame C1 through the cutter roller rotating shaft C52.

Specifically, as shown in FIG. 1, the cutter body C31 is supported and connected mainly through the cutter frame body C11. The cutter handle screw C42 is threadedly connected to the cutter frame body C11. The cutter seat body C21 is hinged to the cutter frame body C11 through the cutter seat rotating shaft C22. The cutter seat torsion spring C23 ensures the reset of the cutter seat body C21. The cutter body C31 is mounted on the cutter seat body C21 through the cutter rotating shaft C32 and can rotate on the cutter rotating shaft C32. The cutter roller body C51 is mounted on the cutter frame body C11 through the cutter roller rotating shaft C52 and can rotate around the cutter roller rotating shaft C52. The cutter frame support shaft C13 is mounted in a hole of the cutter frame body C11 and limited by a cutter seat shaft pin, and the cutter assembly is hinged to the carriage assembly through the cutter frame rotating shaft C12.

The cutter assembly is at the working position when in operation, so that the pipe fitting to be processed is tangential to the cutter roller body C51. The cutter handle C4 is rotated clockwise to move in the direction of the cutter seat C2. When the cutter wheel C3 is tangential to the pipe fitting, the button switch of the device is pressed down, so that the pipe fitting performs a rotational motion. The cutter handle C4 is forcedly rotated clockwise again to push the cutter seat C2 and the cutter wheel C3 to cut into the pipe fitting until the pipe fitting is cut off. Thus, the pipe cutting work is completed. After the cutter handle C4 is rotated reversely, the cutter seat torsion spring C23 can automatically reset the cutter seat body C21, so as to reset the cutter wheel C3.

Figure 16:
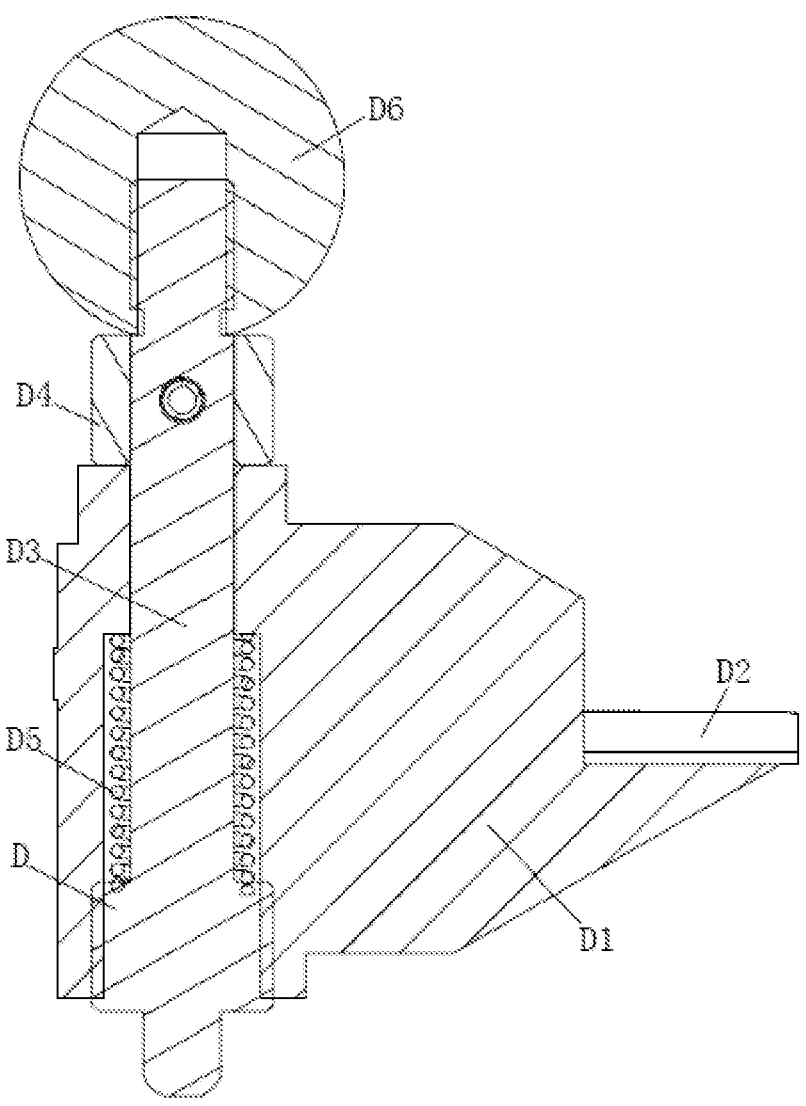
FIG. 16 is a sectional view of a reamer assembly according to an embodiment of the present disclosure.
Figure 17:
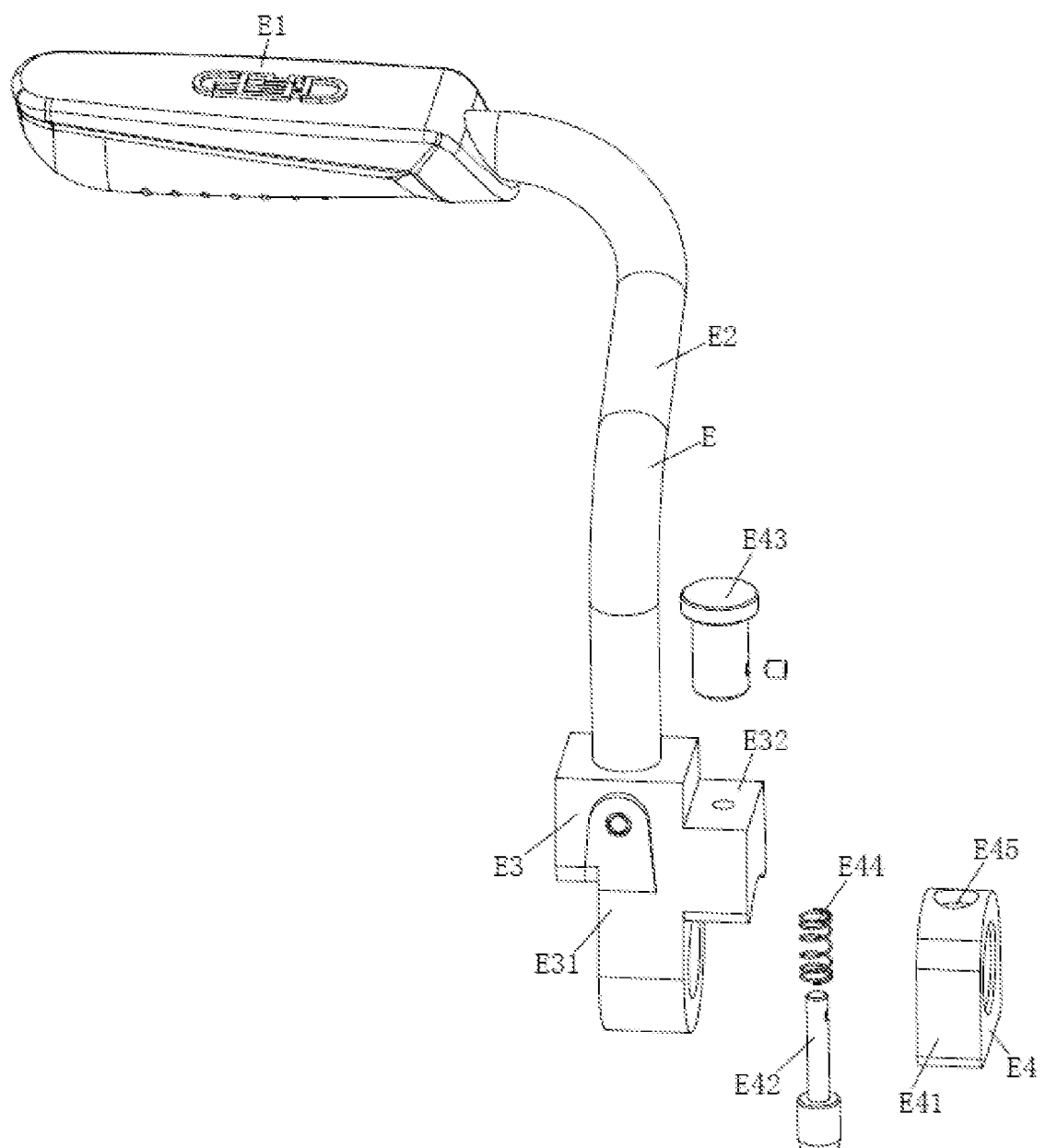
FIG. 17 is an exploded view of a lifting handle assembly according to an embodiment of the present disclosure.
Figure 18:
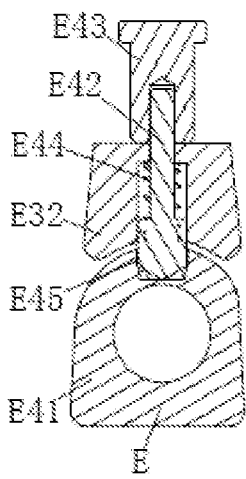
FIG. 18 is a sectional view of a lifting handle assembly according to an embodiment of the present disclosure.
Figure 19:
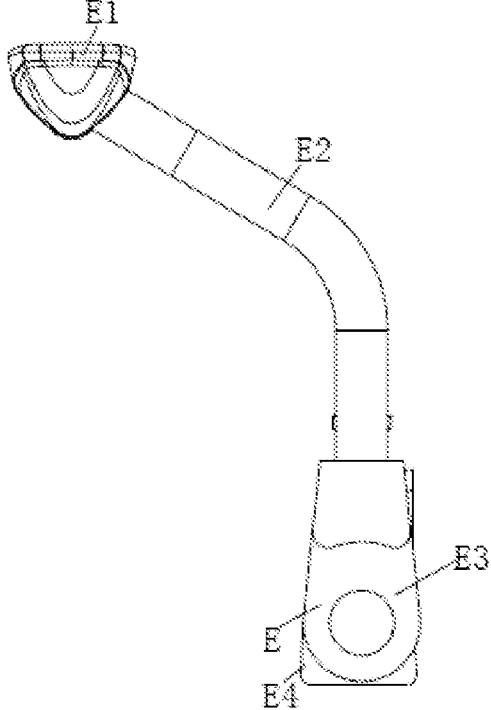
FIG. 19 is a schematic structural diagram illustrating a state of a lifting handle assembly during carrying of a device according to an embodiment of the present disclosure.
Figure 20:
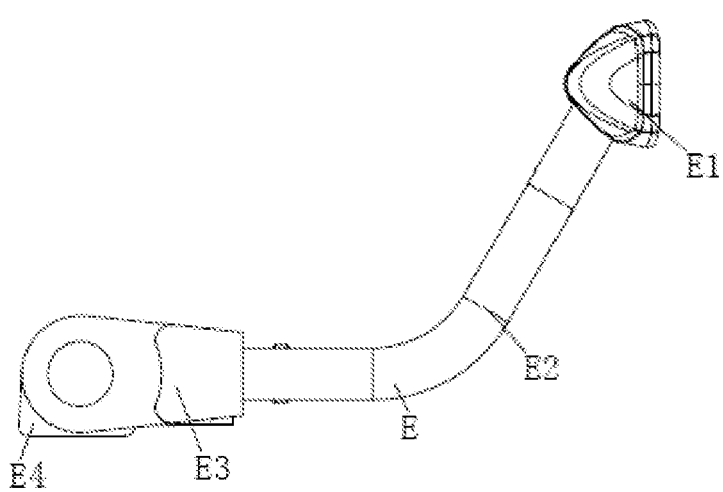
FIG. 20 is a schematic structural diagram illustrating a state of a lifting handle assembly during working of a device according to an embodiment of the present disclosure.

In this embodiment, the reamer assembly D (as shown in FIG. 15 and FIG. 16) includes a reamer seat D1, a reamer cone D2, a reamer stop pin D3, a reamer retainer ring D4, a reamer pressure spring D5, a reamer handle D6, and a reamer rotating shaft D7. Both the reamer cone D2 and the reamer rotating shaft D7 are mounted on the reamer seat D1. The reamer stop pin D3 is mounted on the reamer seat D1 through the reamer retainer ring D4. The reamer pressure spring D5 is sleeved on the reamer stop pin D3. The reamer handle D6 is mounted on the reamer stop pin D3. The reamer pressure spring D5 is provided with one end in contact with the reamer seat D1 and the other end in contact with the reamer stop pin D3, and the reamer seat D1 is mounted on the carriage body F23 through the reamer rotating shaft D7.

In this embodiment, the reamer seat D1 includes a reamer seat body D11, a reamer cone seat D12, a reamer stop pin seat D13, and a reamer rotating shaft seat D14. The reamer cone seat D12, the reamer stop pin seat D13, and the reamer rotating shaft seat D14 are all arranged on the reamer seat body D11. The reamer cone D2 is mounted on the reamer cone seat D12, the reamer stop pin D3 is mounted on the reamer stop pin seat D13, and the reamer rotating shaft D7 is mounted on the reamer rotating shaft seat D14.

Specifically, the reamer assembly is supported mainly by the reamer seat D1. The reamer cone D2 is fixed on the reamer seat D1 through a cross recessed countersunk head screw. The reamer pressure spring D5 is sleeved on the reamer stop pin D3, and the two are mounted in the hole of the reamer seat D1 together. An upper end of the reamer stop pin D3 and the reamer retainer ring D4 are connected together through a heavy-duty elastic cylindrical pin. The reamer handle D6 is threadedly connected to a top end of the reamer stop pin D3. When the reamer handle D6 is pulled upwards, the upper end of the reamer stop pin D3, the reamer retainer ring D4, and the heavy-duty elastic cylindrical pin that are connected together will move up together. The reamer handle is automatically reset under the action of the reamer pressure spring D5 after being loosened. The reamer seat D1 is hinged to the carriage assembly through the reamer rotating shaft D7 and fixed with the carriage assembly through a heavy-duty elastic cylindrical pin. When the reamer stop pin D3 is aligned to a reamer stop pin hole on the carriage assembly, the reamer handle D6 is loosened, and the reamer assembly can be automatically reset through the reamer pressure spring D5, so that the reamer assembly and the carriage assembly can be fixed to conveniently process the pipe fitting.

In this embodiment, the lifting handle assembly E (as shown in FIG. 17 to FIG. 20) includes a lifting handle E1, a lifting handle rod E2, a lifting handle seat E3, and a lifting handle positioning mechanism E4. The lifting handle E1 is mounted on the lifting handle rod E2, the lifting handle rod E2 is mounted on the lifting handle seat E3, and the lifting handle seat E3 is matched with the lifting handle positioning mechanism E4 Both the lifting handle seat E3 and the lifting handle positioning mechanism E4 are mounted on the rear guide pillar F22.

In this embodiment, the lifting handle seat E3 includes a lifting handle seat body E31 and a lifting handle positioning seat E32. The lifting handle seat body E31 is fixed to the lifting handle positioning seat E32. The lifting handle rod E2 is mounted on the lifting handle seat body E31. The lifting handle positioning seat E32 is matched with the lifting handle positioning mechanism E4.

In this embodiment, the lifting handle positioning mechanism E4 includes a lifting handle positioning block E41, a lifting handle bolt E42, a lifting handle bolt cap E43, and a lifting handle pressure spring E44. The lifting handle bolt cap E43 is mounted on the lifting handle bolt E42. The lifting handle bolt E42 is mounted on the lifting handle seat E3. The lifting handle pressure spring E44 is sleeved on the lifting handle bolt E42, and the lifting handle bolt E42 is matched with the lifting handle positioning block E41.

In this embodiment, the lifting handle pressure spring E44 is provided with one end in contact with the lifting handle seat E3 and the other end in contact with the lifting handle bolt E42. The lifting handle positioning block E41 is provided with a lifting handle positioning hole E45, and the lifting handle bolt E42 is located in the lifting handle positioning hole E45.

Specifically, the lifting handle E1 in the lifting handle assembly is in interference fit with the lifting handle rod E2, the lifting handle rod E2 is fixed on the lifting handle seat E3 through a heavy-duty straight groove elastic cylindrical pin. The lifting handle pressure spring E44 and the lifting handle bolt E42 are mounted in the hole on the lifting handle seat E3, and the upper end of the lifting handle bolt E42 is connected together with the lifting handle bolt cap E43 through a hexagon socket cap screw.

Figure 5:
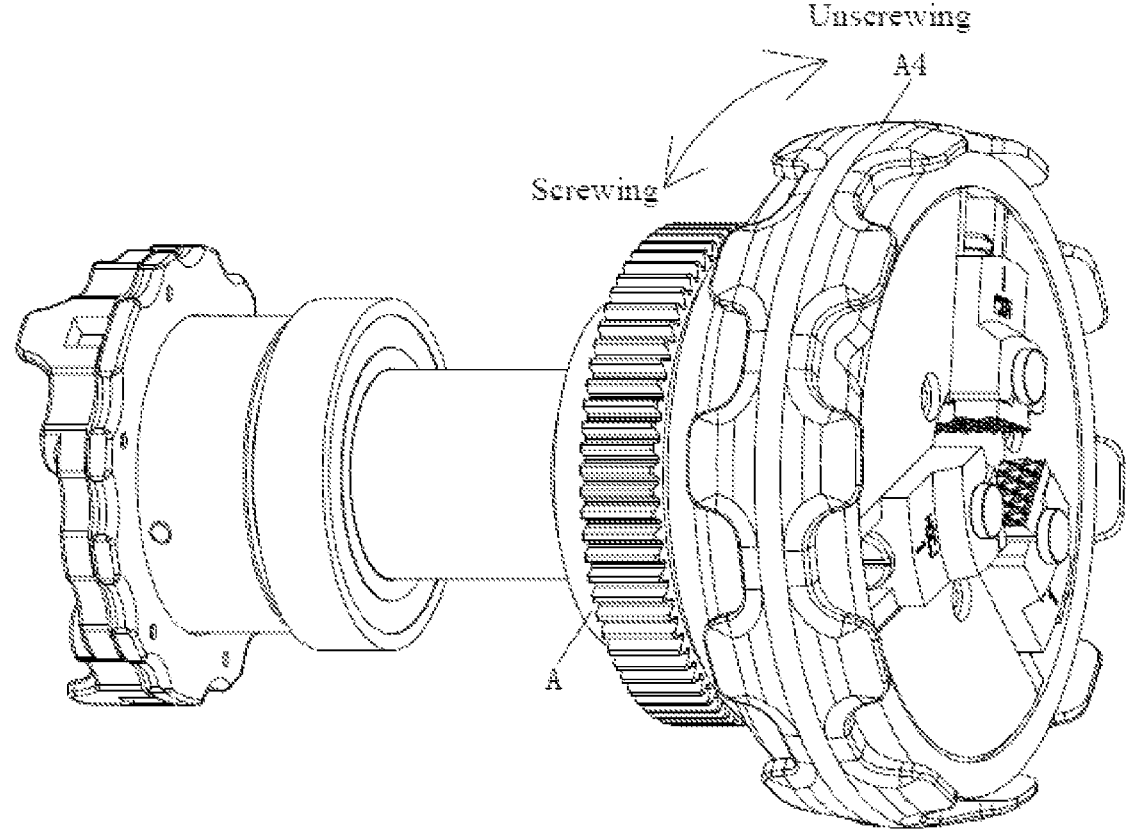
FIG. 5 is a stereogram of a spindle assembly according to an embodiment of the present disclosure.
Figure 6:
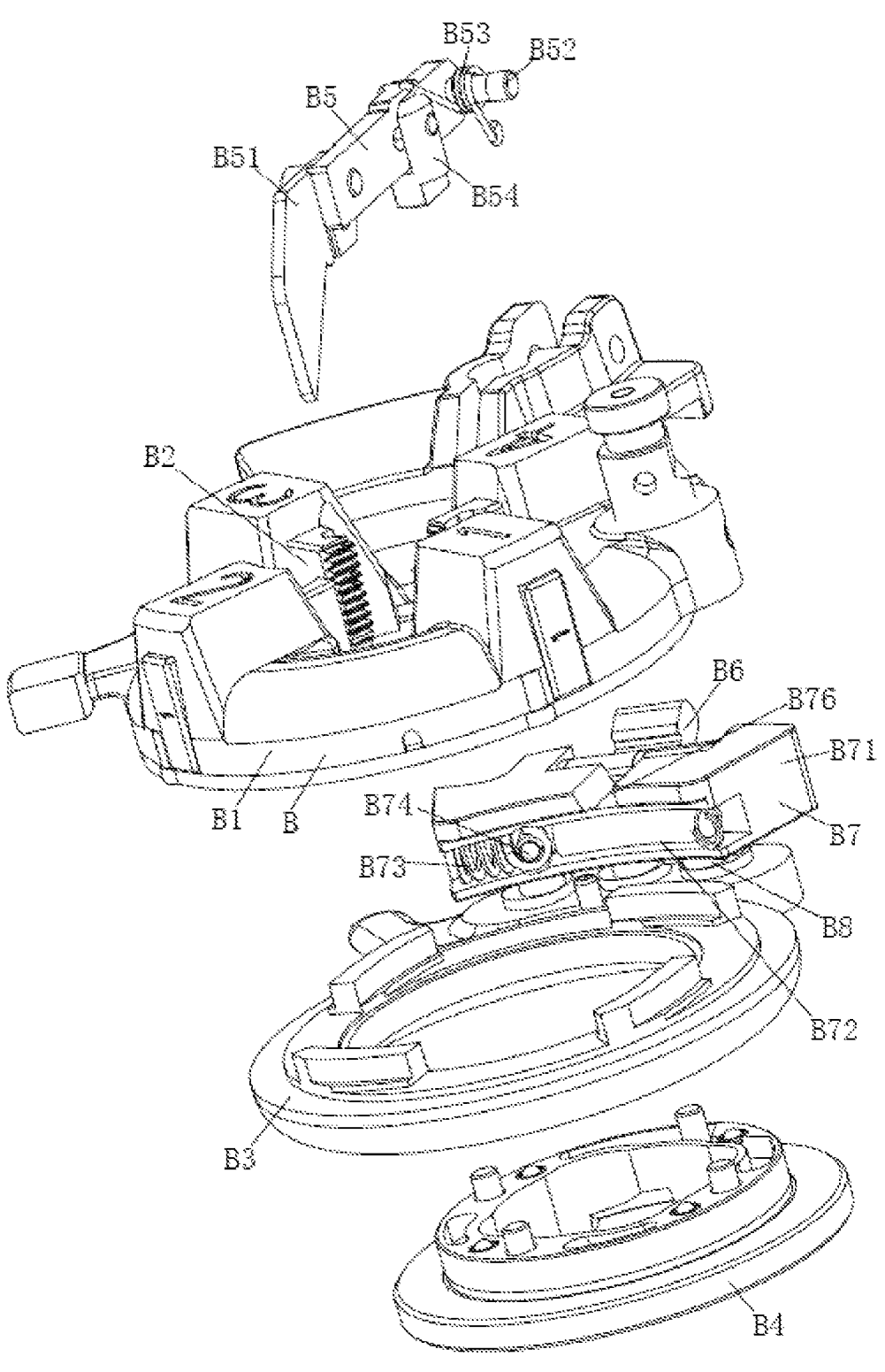
FIG. 6 is an exploded view of a die head assembly according to an embodiment of the present disclosure.
Figure 7:
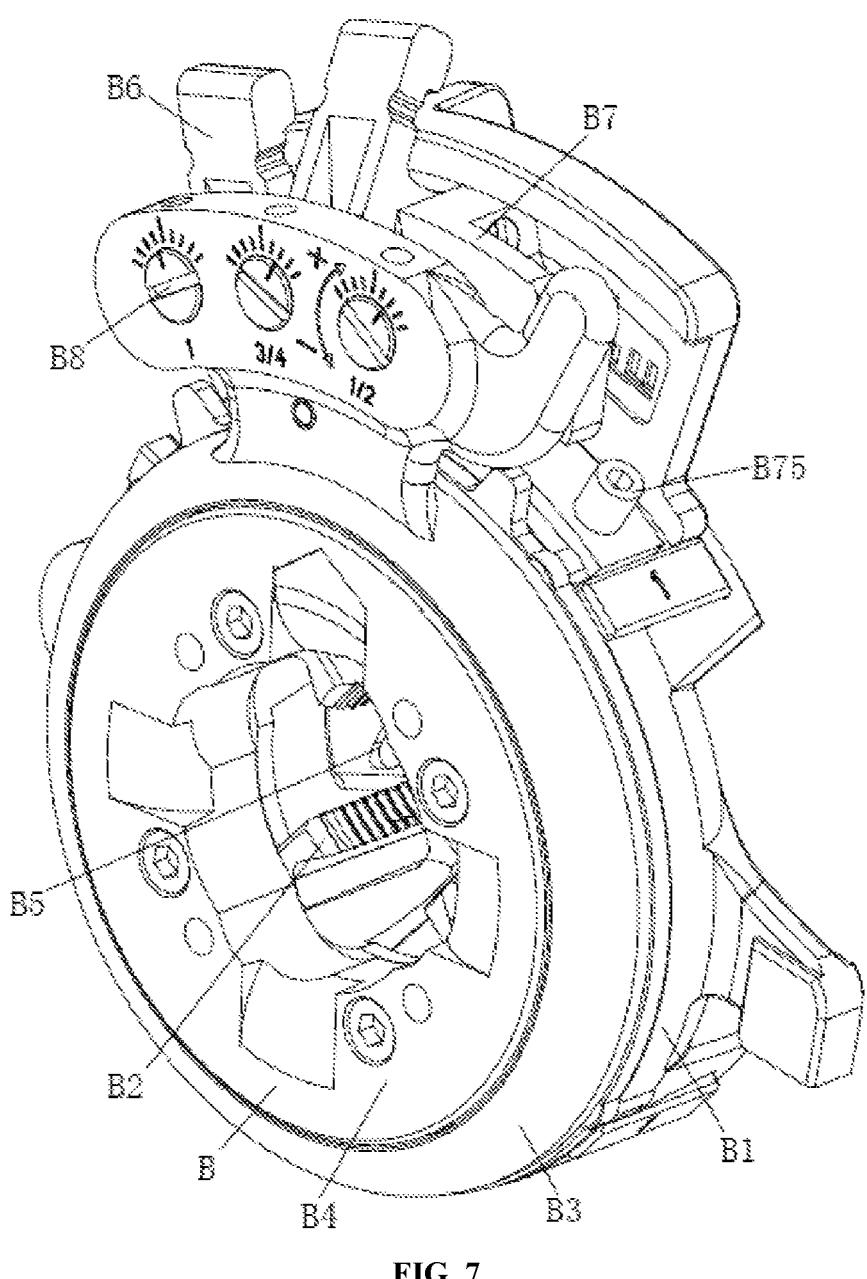
FIG. 7 is a stereogram of a die head assembly according to an embodiment of the present disclosure.
Figure 9C:
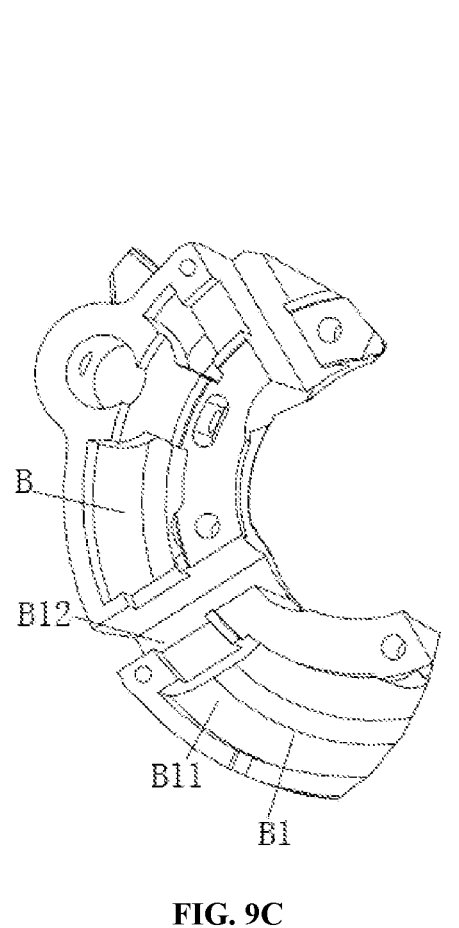
FIG. 9C is a stereogram of a die disc according to an embodiment of the present disclosure.
Figure 9D:
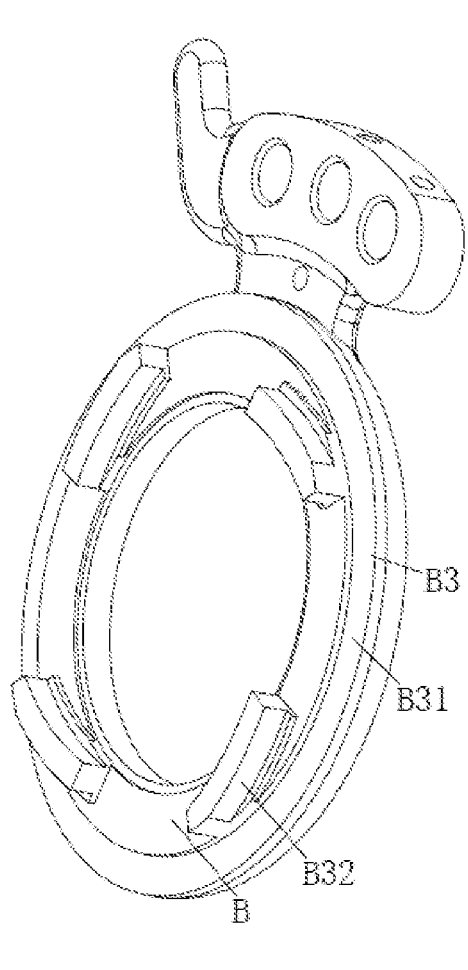
FIG. 9D is a stereogram of a curve disc according to an embodiment of the present disclosure.

The lifting handle assembly is sleeved on the rear guide pillar, and the axial position thereof is limited by the main machine body and the secondary machine body. When the lifting handle bolt E42 is pinned into the lifting handle positioning hole E45 at the upper end of the lifting handle positioning block E41, the lifting handle assembly is at a manual position. When the lifting handle bolt cap E43 is pulled upwards, it drives the lifting handle bolt E42 to separate from the lifting handle positioning hole E45 at the upper end of the lifting handle positioning block E41. In this case, the lifting handle assembly can be rotated to the working position of the device as shown in FIG. 5, and the position of the lifting handle assembly can be adjusted according to the working or carrying state of the device, such that the pipe fitting is conveniently processed.

In this embodiment, the threading method of a bench pipe threading machine includes the following steps:

step one, preparation before work: place a cutter assembly C, a die head assembly B, and a reamer assembly D all at non-working positions; insert a pipe fitting to be processed into a spindle A3 and a front chuck A1 from a rear chuck A2, such that the pipe fitting is longer than the front chuck A1; rotate a hammering disc A4 in a screwing direction; pre-clamp the pipe fitting; screw the rear chuck A2, such that the pipe fitting is concentric with a spindle gear A5; and forcibly rotate the hammering disc A4 in the screwing direction, such that the front chuck A1 clamps the pipe fitting;

step two, power-on check: press down a button switch to enable the switch to be in a closed state, such that a transmission motor F31 drives two groups of transmission gears F32 to rotate, one group of transmission gears F32 drives a gear pump F33 to rotate, a lubricating and cooling system starts to work, the other group of transmission gears F32 drives the spindle gear A5 to rotate, the spindle gear A5 drives the front chuck A1, the rear chuck A2, the spindle A3, and the pipe fitting to rotate, and threading oil flows back into an oil pool of a machine body F11 from a carriage body F23;

step three, pipe cutting work: place a cutter assembly C at a working position, rotate a cutter handle C4 to enable the pipe fitting and a cutter wheel C3 to be at proper positions, rotate the cutter handle C4 clockwise, such that the pipe fitting rotates and the cutter wheel C3 cuts off the pipe fitting, so as to complete the pipe cutting work;

step four, inner angle chamfering work: since the processed pipe fitting is cut off by means of cold extrusion, an inner hole on the cut end surface is slightly reduced; enable the reamer assembly 11 to chamfer the end surface of the inner hole of the processed pipe fitting to eliminate the reduction of the inner hole caused by cold extrusion; place the reamer assembly D at a working position, rotate a reamer handle D6 clockwise to enable a conical surface of a reamer cone D2 and a conical surface of a reamer seat D1 to be in contact with an inner hole edge of the pipe fitting, rotate the reamer handle D6 clockwise, and form a chamfer of 45 degrees on the inner hole edge of the pipe fitting by the reamer cone D2; and step five, processing of external pipe threads: place the die head assembly B at a working position, pour a lubricating and cooling liquid on a die B2 from the die head assembly B; rotate a carriage handle F24 clockwise to enable an end surface of the pipe fitting to be in contact with the die B2, rotate the carriage handle F24 clockwise, such that the pipe fitting rotates and the die B2 processes threads on an outer wall of the pipe fitting; after the thread processing is completed, place a trigger mechanism B5 at an opening position to enable a locking block mechanism B6 to break away from the limit of the trigger mechanism B5 to drive a curve disc B3 to be in a disengaged state and the die B2 to break away from the pipe fitting to complete the external thread processing; and rotate the carriage handle F24 counterclockwise to separate the die head assembly B from the pipe fitting; push a small handle on the curve disc B3 to enable the trigger mechanism B5 to be at a closed position and the curve disc B3 to drive the die B2 to be at a working position, so as to perform next processing of external pipe threads.

Figure 24:
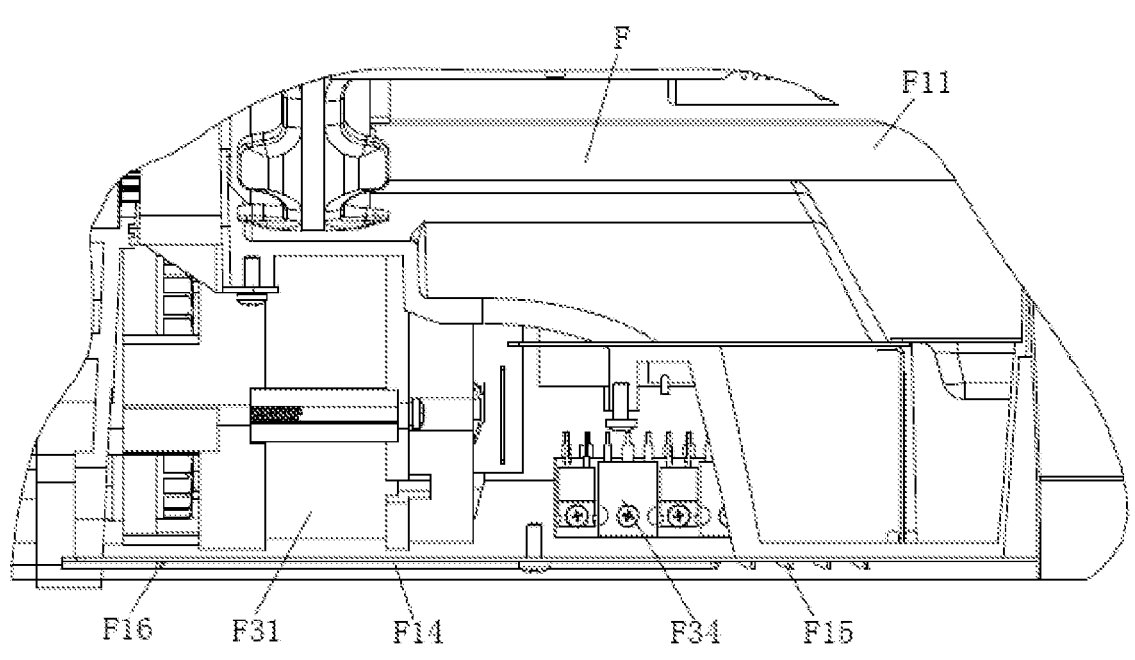
FIG. 24 is a local view of a frame assembly according to an embodiment of the present disclosure.
Figure 25:
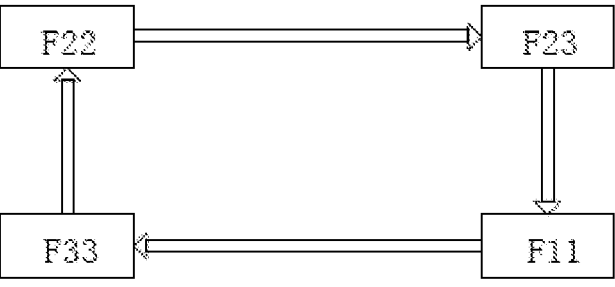
FIG. 25 is a schematic diagram of a lubricating and cooling system when a die head assembly is at a non-working position according to an embodiment of the present disclosure.
Figure 26:
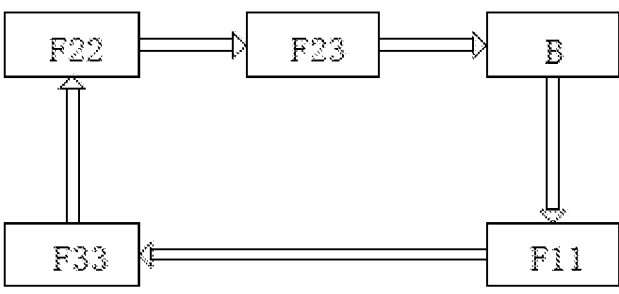
FIG. 26 is a schematic diagram of a lubricating and cooling system when a die head assembly is at a working position according to an embodiment of the present disclosure.

The bench pipe threading machine is provided with a lubricating and cooling system (as shown in FIG. 24 and FIG. 25) for the pipe fitting to be processed and the die head assembly B. The special threading oil is stored in the oil pool of the main machine body F11. After the device runs, one of the two groups of transmission gears F32 drives the gear pump F33, so that the special threading oil enters an oil inlet cavity of the gear pump F33 through the secondary machine body F12 from the oil pool of the main machine body F11, generates a low pressure by the oil inlet cavity through gear engagement, enters the rear guide pillar F22 via the secondary machine body F12, and enters the carriage body F23. When the die head assembly B is at the non-working position (as shown in FIG. 24), the threading oil flows back into the oil pool of the main machine body F11 below. When the die head assembly B is at the working position (as shown in FIG. 25), the threading oil enters the die head assembly B via the carriage body F23. The special oil passing through an oil way threading machine of the die head assembly B is poured in a cutting area for the machined part and the die B2, so that the machined part and the die B2 are lubricated and cooled. The threading oil then flows back into the oil pool of the main machine body F11 below.

In addition, it should be noted that the specific embodiments described in this specification may have parts and components with different shapes and names, and the above content described in this specification is only an illustration of the structure of the present disclosure. All equivalent changes or simple changes made according to the structure, features, and principles described in the patent concept of the present disclosure are included in the protection scope of the patent of the present disclosure. Various modifications or supplementations of the specific embodiments described or substitutions in a similar manner made by those skilled in the art without departing from the concept of the present disclosure or going beyond the scope as defined in the appended claims should fall within the protection scope of the present disclosure.

What is claimed is:

1. A bench machine for threading a pipe, the machine comprising a spindle assembly, a die head assembly, a cutter assembly, a reamer assembly, a lifting handle assembly, and a frame assembly, wherein the spindle assembly, the die head assembly, the cutter assembly, the reamer assembly, and the lifting handle assembly are all mounted on the frame assembly, and the die head assembly, the cutter assembly, and the reamer assembly are configured to cooperate with the spindle assembly;

the frame assembly comprises a frame mechanism and a carriage mechanism, wherein the carriage mechanism is mounted on the frame mechanism, a transmission mechanism is mounted in the frame mechanism and connected to the spindle assembly, the spindle assembly and the lifting handle assembly are mounted on the frame mechanism, and the die head assembly, the cutter assembly, and the reamer assembly are mounted on the carriage mechanism;

the spindle assembly comprises a front chuck, a rear chuck, a spindle, a rotating disc, a spindle gear, and a spindle bearing, wherein the spindle gear is mounted at a first end of the spindle, wherein the front chuck is mounted on the spindle gear, the rear chuck is mounted at a second end of the spindle, the rotating disc is mounted on the front chuck, the spindle bearing is sleeved on the spindle, and the spindle is mounted on the frame assembly via the spindle bearing;

wherein the die head assembly comprises a die disc, a die, a curve disc, a retaining ring, a trigger mechanism, a locking block mechanism, a slider mechanism, and an adjustment eccentric shaft, wherein the die is mounted on the die disc, the curve disc is mounted on the die disc via the retaining ring and configured to cooperate with the die, the slider mechanism is configured to cooperate with the die disc, the locking block mechanism is mounted on the slider mechanism, the adjustment eccentric shaft is mounted on the curve disc and configured to cooperate with the locking block mechanism, the trigger mechanism is mounted on the die disc and configured to cooperate with the slider mechanism, and the die disc is mounted on the frame assembly.

2. The bench machine for threading a pipe according to claim 1, wherein the carriage mechanism comprises a forward guide pillar, a back guide pillar, a carriage body, a carriage handle, carriage engagement teeth, and a carriage gear, wherein the forward guide pillar and the rear guide pillar are mounted on the frame mechanism, where the forward guide pillar is closer to the carriage engagement teeth than the back guide pillar is, the carriage body is mounted on the forward guide pillar and the back guide pillar, the carriage handle is mounted on the carriage body, the carriage engagement teeth are arranged on the forward guide pillar, the carriage gear is connected to the carriage handle, the carriage engagement teeth are engaged with the carriage gear, and the die head assembly and the cutter assembly are mounted on the carriage body; and the bench machine further comprises a lithium battery assembly for supplying power.

3. The bench machine for threading a pipe according to claim 1, wherein the slider mechanism comprises a slider body, a slider reset spring, a slider buffer spring, a spring connection pillar, a spring ejection pillar, and a trigger limiting groove, wherein the spring connection pillar is arranged on the slider body, a first end of the slider reset spring and a first end of the slider buffer spring are connected to the spring connection pillar, each of a second end of the slider reset spring and a second end of the slider buffer spring is connected to the spring ejection pillar, the spring ejection pillar is arranged on the die disc, and the trigger limiting groove is arranged on the slider body and configured to cooperate with the trigger mechanism.

4. The bench machine for threading a pipe according to claim 1, wherein the locking block mechanism comprises a locking block body, a locking block rotating shaft, a locking block positioning groove, a locking block positioning pillar, a locking block positioning spring, and a locking block adjustment groove, wherein the locking block body is mounted on the slider mechanism via the locking block rotating shaft, the locking block positioning groove is arranged on the locking block body, the locking block positioning pillar is mounted on the slider mechanism via the locking block positioning spring, the locking block positioning pillar is located in the locking block positioning groove, the locking block adjustment groove is arranged on the locking block body, and the adjustment eccentric shaft is located in the locking block adjustment groove.

5. The bench machine for threading a pipe according to claim 1, wherein the trigger mechanism comprises a trigger body, a trigger rotating shaft, a trigger torsion spring, and a trigger limiting pillar, wherein the trigger body is mounted on the die disc via the trigger rotating shaft, the trigger torsion spring is sleeved on the trigger rotating shaft, the trigger torsion spring comprises a first end in contact with the die disc and a second end in contact with the trigger body, and a trigger limiting column comprises a first end connected to the trigger body and the trigger limiting column further comprises a second end in contact with an end surface of the slider body.

6. The bench machine for threading a pipe according to claim 1, wherein the cutter assembly comprises a cutter frame, a cutter seat, a cutter wheel, a cutter handle, and a cutter roller, wherein the cutter seat, the cutter handle, and the cutter roller are mounted on the cutter frame, the cutter wheel is mounted on the cutter seat, the cutter wheel is configured to cooperate with the cutter roller, the cutter handle is in contact with the cutter seat, and the cutter frame is mounted on the frame assembly.

7. The bench machine for threading a pipe according to claim 1, wherein the reamer assembly comprises a reamer seat, a reamer cone, a reamer stop pin, a reamer retainer ring, a reamer pressure spring, a reamer handle, and a reamer rotating shaft, wherein the reamer cone is mounted on the reamer seat, the reamer stop pin is mounted on the reamer seat via the reamer retainer ring, the reamer pressure spring is sleeved on the reamer stop pin, the reamer pressure spring comprises a first end in contact with the reamer seat and a second end in contact with the reamer stop pin, the reamer handle is mounted on the reamer stop pin, and the reamer seat is mounted on the frame assembly via the reamer rotating shaft.

8. The bench machine for threading a pipe according to claim 1, wherein the lifting handle assembly comprises a lifting handle, a lifting handle rod, a lifting handle seat, and a lifting handle positioning mechanism, wherein the lifting handle is mounted on the lifting handle rod, the lifting handle rod is mounted on the lifting handle seat, and the lifting handle seat is configured to cooperate with the lifting handle positioning mechanism.

9. A threading method of using the bench threading machine according to claim 1, comprising the following steps:

step one, preparation before work: placing the cutter assembly, the die head assembly, and the reamer assembly at non-working positions; and providing a pipe fitting that is to be processed that is longer than the front chuck and inserting the pipe fitting into the spindle and into the front chuck from the rear chuck, rotating the rotating disc in a screwing direction, pre-clamping the pipe fitting, screwing the rear chuck, enabling the pipe fitting to be concentric with the spindle gear, and forcibly rotating the rotating disc in the screwing direction, to enable the front chuck to clamp the pipe fitting;

step two, power-on check: pressing down a button switch to enable the switch to be in a closed state such that a transmission motor drives two groups of transmission gears to rotate, a first group of the two groups of the transmission gears drives a gear pump to rotate, a second group of the two groups of the transmission gears drives the spindle gear to rotate, the spindle gear drives the front chuck, the rear chuck, the spindle, and the pipe fitting to rotate, and threading oil flows into an oil pool of a machine body of the frame mechanism from a carriage body of the carriage mechanism;

step three, pipe cutting work: placing the cutter assembly at a working position, rotating a cutter handle to enable the pipe fitting and a cutter wheel to be at positions, rotating the cutter handle clockwise, and rotating the pipe fitting so that the cutter wheel cuts off the pipe fitting, completing the pipe cutting work;

step four, inner angle chamfering work: placing the reamer assembly at a working position, rotating a reamer handle clockwise to enable a conical surface of a reamer cone and a conical surface of a reamer seat to be in contact with an inner hole edge of the pipe fitting, rotating the reamer handle clockwise, and forming a chamfer on the inner hole edge of the pipe fitting via the reamer cone; and step five, processing of external pipe threads: placing the die head assembly at a working position, pouring a lubricating and cooling liquid on a die of the die head assembly, rotating a carriage handle clockwise to enable an end surface of the pipe fitting to be in contact with the die, rotating the carriage handle clockwise, to enable the die to process threads on an outer wall of the pipe fitting; after the thread processing is completed, placing the trigger mechanism at an opening position, enabling the locking block mechanism to break away from a limit of the trigger mechanism to drive the curve disc to be in a disengaged state, and the die to break away from the pipe fitting to complete the external thread processing; and rotating the carriage handle counterclockwise to separate the die head assembly from the pipe fitting, pushing the curve disc to enable the trigger mechanism to be at a closed position, wherein the curve disc drives the die to be at a working position, to perform next processing of the external pipe threads.

* * * * *